(12) United States Patent
Takahama

(10) Patent No.: US 9,633,280 B2
(45) Date of Patent: Apr. 25, 2017

(54) IMAGE PROCESSING APPARATUS, METHOD, AND STORAGE MEDIUM FOR DETERMINING PIXEL SIMILARITIES

(71) Applicant: CANON KABUSHIKI KAISHA, Tokyo (JP)

(72) Inventor: Atsushi Takahama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 45 days.

(21) Appl. No.: 14/552,022

(22) Filed: Nov. 24, 2014

(65) Prior Publication Data

US 2015/0156484 A1 Jun. 4, 2015

(30) Foreign Application Priority Data

Nov. 29, 2013 (JP) .................. 2013-248039

(51) Int. Cl.
| | |
|---|---|
| *H04N 9/64* | (2006.01) |
| *G06K 9/62* | (2006.01) |
| *G06K 9/40* | (2006.01) |
| *H04N 5/367* | (2011.01) |
| *G06T 5/00* | (2006.01) |
| *G06T 5/50* | (2006.01) |

(Continued)

(52) U.S. Cl.
CPC ............ *G06K 9/6202* (2013.01); *G06K 9/40* (2013.01); *G06T 5/002* (2013.01); *G06T 5/50* (2013.01); *G06T 7/0075* (2013.01); *H04N 5/367* (2013.01); *H04N 2013/0081* (2013.01)

(58) Field of Classification Search
CPC ........ H04N 5/372; H04N 5/374; H04N 5/357; H04N 5/2173; H04N 9/045; G06T 2207/20076; G06T 5/002; G06T 5/50; G06T 7/0085

USPC .................... 348/222.1, 241–252
See application file for complete search history.

(56) References Cited

U.S. PATENT DOCUMENTS

| | | | | |
|---|---|---|---|---|
| 7,940,314 B2* | 5/2011 | Nakakuki | ............. | H04N 9/045 348/241 |
| 2006/0066736 A1* | 3/2006 | Tsuruoka | ............... | H04N 5/367 348/241 |

(Continued)

FOREIGN PATENT DOCUMENTS

| | | |
|---|---|---|
| JP | 10-289315 A | 10/1998 |
| JP | 2006-339957 A | 12/2006 |

(Continued)

*Primary Examiner* — Kelly L Jerabek
(74) *Attorney, Agent, or Firm* — Canon U.S.A., Inc. IP Divison

(57) ABSTRACT

An image processing apparatus executes image processing on image data obtained by forming an image on an image pickup element. The image processing apparatus includes an obtaining unit configured to obtain a pixel in the image data corresponding to a specific position in the image pickup element as a specific pixel, a determination unit configured to determine a target region including a target pixel and a reference region including a reference pixel which are used for determining a degree of similarity between the target pixel and the reference pixel in accordance with the specific pixel obtained by the obtaining unit, and a calculation unit configured to calculate a degree of similarity between the target pixel and the reference pixel by comparing the target region and the reference region determined by the determination unit.

14 Claims, 24 Drawing Sheets

(51) Int. Cl.
*G06T 7/00* (2017.01)
*H04N 5/217* (2011.01)
*H04N 13/00* (2006.01)

(56) References Cited

U.S. PATENT DOCUMENTS

| | | | |
|---|---|---|---|
| 2011/0069904 A1* | 3/2011 | Yang | G06T 5/002 |
| | | | 382/275 |
| 2011/0149150 A1* | 6/2011 | Jia | G06T 1/00 |
| | | | 348/452 |
| 2012/0013752 A1* | 1/2012 | Matsuoka | H04N 5/23267 |
| | | | 348/208.4 |
| 2012/0133804 A1* | 5/2012 | Kim | H04N 5/3675 |
| | | | 348/246 |
| 2013/0215232 A1* | 8/2013 | Nanri | G01C 11/06 |
| | | | 348/46 |
| 2013/0329999 A1* | 12/2013 | Imagawa | G06K 9/40 |
| | | | 382/167 |
| 2014/0028880 A1* | 1/2014 | Kawaguchi | H04N 5/357 |
| | | | 348/241 |

FOREIGN PATENT DOCUMENTS

| | | |
|---|---|---|
| JP | 2007-536662 A | 12/2007 |
| JP | 2011-039675 A | 2/2011 |

* cited by examiner

FIG. 6A

| 60 | 50 | 200 | 220 | 180 |
|----|----|-----|-----|-----|
| 50 | 40 | 140 | 250 | 200 |
| 40 | 70 | 60  | 140 | 160 |
| 50 | 50 | 80  | 130 | 100 |
| 30 | 50 | 60  | 30  | 50  |

PIXEL VALUE

FIG. 6B

| 0 | 0 | 0 | 0 | 0 |
|---|---|---|---|---|
| 0 | 0 | 0 | 0 | 0 |
| 0 | 0 | 0 | 1 | 0 |
| 0 | 1 | 0 | 0 | 0 |
| 0 | 0 | 0 | 0 | 0 |

DEFECT INFORMATION

0: NORMAL PIXEL
1: DEFECTIVE PIXEL

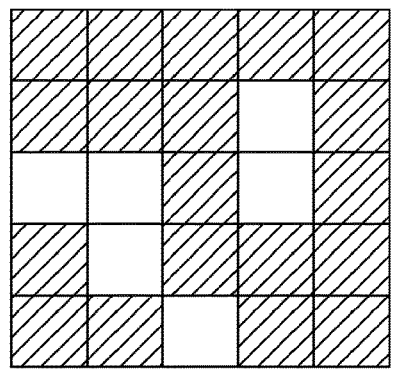

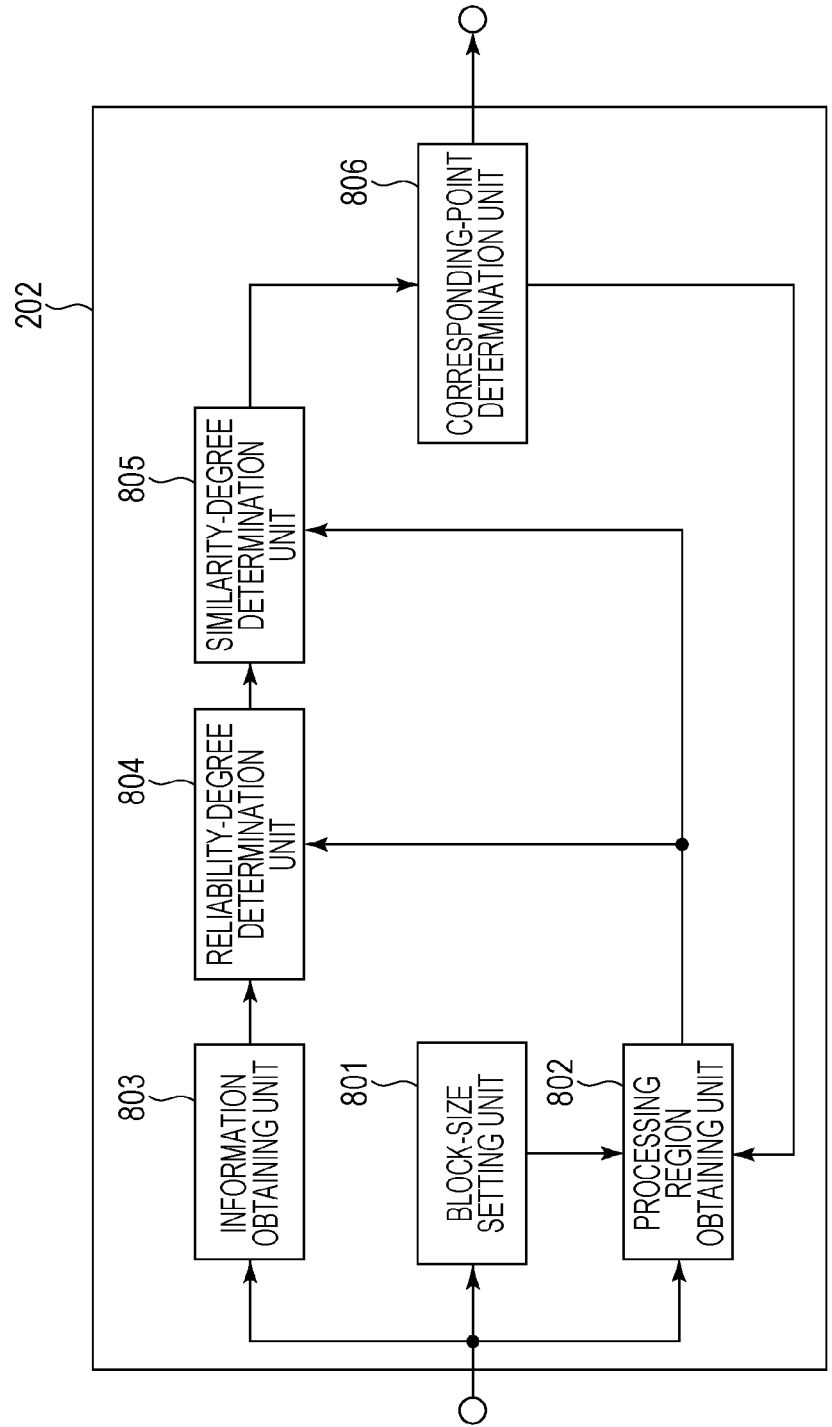

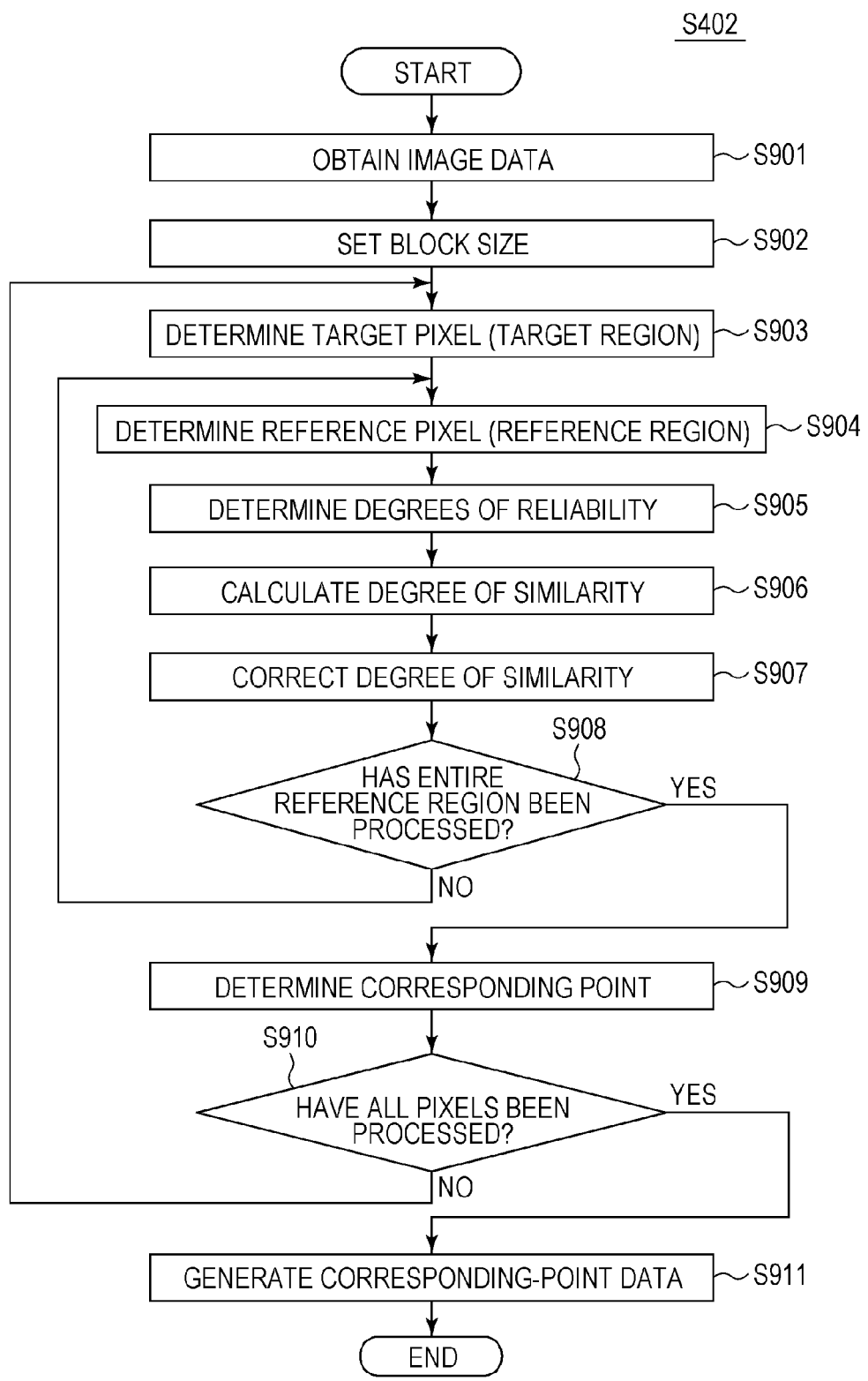

FIG. 10A

| 60 | 50 | 200 | 220 | 180 |
|---|---|---|---|---|
| 50 | 40 | 140 | ○ | 200 |
| ○ | ○ | 80 | 150 | 170 |
| 50 | 30 | 40 | 140 | 90 |
| 20 | 50 | ○ | 30 | 50 |

DEFECTIVE (upper left arrow to 50)
SATURATION (middle left arrow)
DEFECTIVE (lower left arrow)

TARGET REGION

FIG. 10B

| 90 | 40 | 180 | 230 | 190 |
|---|---|---|---|---|
| 80 | 50 | 160 | 200 | 210 |
| 40 | 30 | 60 | ○ | 170 |
| 40 | ○ | 40 | 120 | 70 |
| 20 | 50 | ○ | 20 | 60 |

SATURATION

REFERENCE REGION

FIG. 10C

| 1 | 1 | 1 | 1 | 1 |
|---|---|---|---|---|
| 1 | 1 | 1 | 0 | 1 |
| 0 | 0.5 | 1 | 0.5 | 1 |
| 1 | 0.5 | 1 | 1 | 1 |
| 1 | 1 | 0 | 1 | 1 |

DEGREES OF RELIABILITY $b_j(p,q)$ $b_s(p,q)$

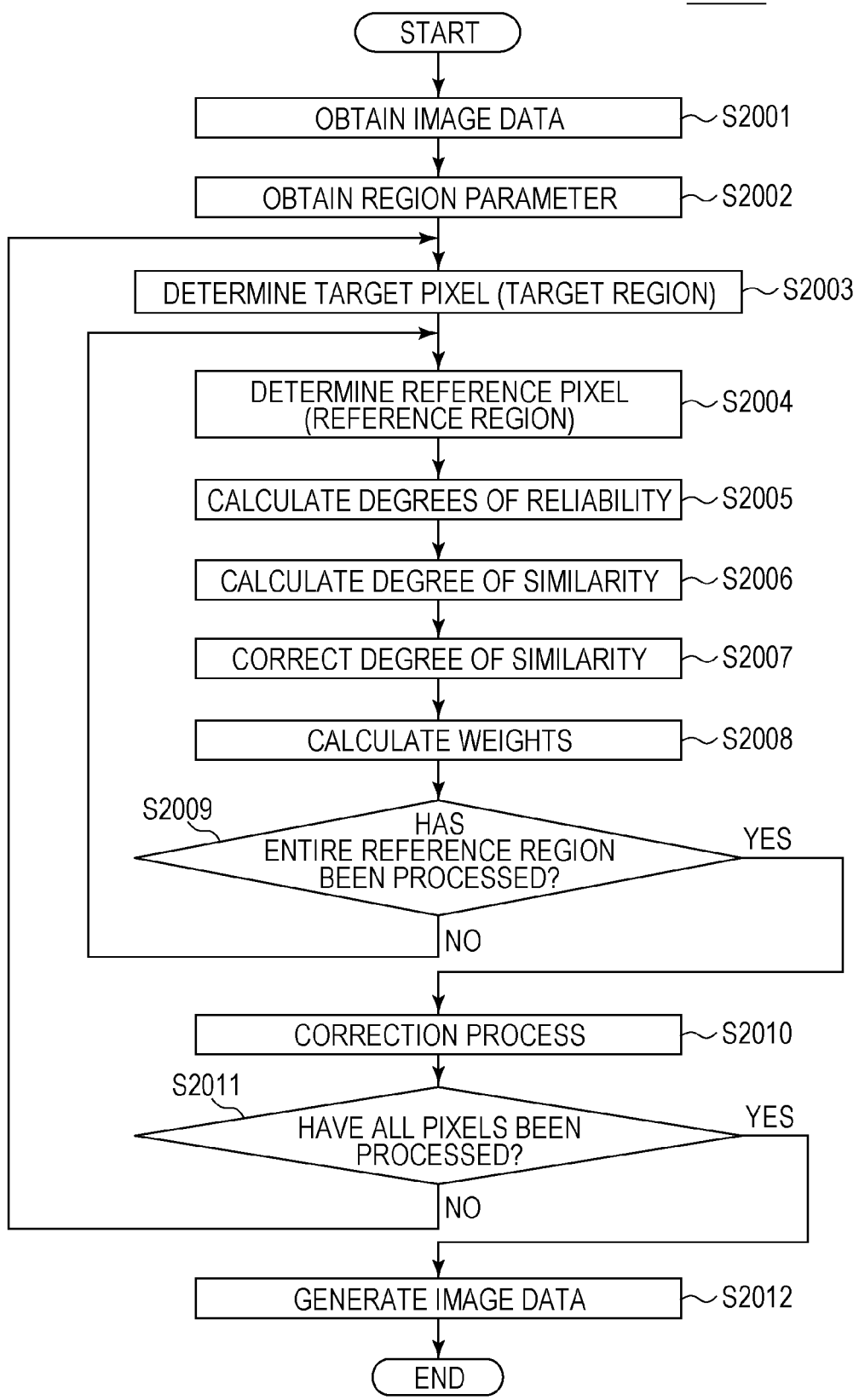

$$C_j = \alpha \sum_x \sum_y (b_j(x, y) - b_s(x, y))^2 \qquad (x, y) \neq (0, 1), (2, 2)$$

THE NUMBER OF ALL PIXELS IN TARGET REGION: 9
THE NUMBER OF SPECIFIC PIXELS: 2

$$\alpha = \frac{\text{THE NUMBER OF ALL PIXELS IN TARGET REGION}}{\text{THE NUMBER OF ALL PIXELS IN TARGET REGION} - \text{THE NUMBER OF SPECIFIC PIXELS}} = \frac{9}{9-2}$$

IMAGE PROCESSING APPARATUS, METHOD, AND STORAGE MEDIUM FOR DETERMINING PIXEL SIMILARITIES

BACKGROUND OF THE INVENTION

Field of the Invention

The present disclosure generally relates to image processing and, more particularly, to an image processing apparatus, method, and storage medium for determining a degree of similarity between a target pixel and a reference pixel in image data.

Description of the Related Art

In an image processing technique, matching methods for determining whether patterns of pixels included in two regions are similar to each other, such as template matching and block matching, have been used. These methods for matching regions are used not only for motion compensation, positioning, and estimation of an optical flow but also for a noise reduction process, for example. Japanese Translation Patent Publication PCT No. 2007-536662 and Japanese Patent Laid-Open No. 2011-39675 disclose methods for performing noise reduction processes in accordance with a degree of similarity between a target pixel and a reference pixel. Specifically, a degree of similarity of a reference pixel relative to a target pixel is calculated by matching between a region including the target pixel and a region including the reference pixel, and a noise reduction process is performed on a pixel value of the target pixel by performing weighted average in accordance with the degree of similarity.

As a degree of similarity, a sum of squared difference (SSD) or a sum of absolute difference (SAD) which is calculated using pixel values of pixels corresponding to each other are widely used. Specifically, by calculating differences between values of pixels corresponding to each other in different regions, a degree of similarity between the regions is calculated. The calculation of the degree of similarity between regions with high accuracy is important for improving effect of objects of various image processes. Note that a method for calculating a degree of similarity using the SSD is disclosed in Japanese Patent Laid-Open No. 10-289315.

In general, damage (defect) may be generated in some pixels in an image pickup element, such as a charge-coupled device (CCD) sensor or a complementary metal-oxide semiconductor (CMOS) sensor, during a fabrication process or the like. As a result, such pixels output pixel values of abnormal levels in image data obtained through image capturing (hereinafter referred to as "defective pixels"). In recent years, some image pickup elements include pixels for specific purposes (an image surface phase difference pixel, a pixel for ranging, and the like) other than purpose of image capturing in an image pickup region. Accordingly, some pixels which may not obtain pixel values in a condition the same as that for other neighboring pixels may be included in an image pickup element. In general, most of the pixels having pixel values recognized as abnormal values are corrected by image processing in the image pickup apparatus. However, pixel values which have been corrected do not represent pixel values obtained as a result of image capturing performed on a target object. Therefore, when a degree of similarity between regions in image data is to be calculated, if defective pixels or pixels for specific purposes are detected, the degree of similarity may not be reliably calculated. Furthermore, there arises the same problem in washed-out (white) pixels and blocked-up shadows (black) pixels which exceed limit of a dynamic range since reliable pixel values are not obtained.

SUMMARY OF THE INVENTION

According to an aspect of the present disclosure, there is provided an image processing apparatus which executes image processing on image data obtained by forming an image on an image pickup element. The image processing apparatus includes an obtaining unit configured to obtain a pixel in the image data corresponding to a specific position in the image pickup element as a specific pixel, a determination unit configured to determine a target region including a target pixel and a reference region including a reference pixel which are used for determining a degree of similarity between the target pixel and the reference pixel in accordance with the specific pixel obtained by the obtaining unit, and a calculation unit configured to calculate a degree of similarity between the target pixel and the reference pixel by comparing the target region and the reference region determined by the determination unit.

Further features of the present disclosure will become apparent from the following description of exemplary embodiments with reference to the attached drawings.

BRIEF DESCRIPTION OF THE DRAWINGS

FIGS. 6A and 6B are diagrams schematically illustrating a portion of image data and defect information stored in advance, respectively.

FIG. 7A is a diagram illustrating a target region,

FIG. 7B is a diagram illustrating a reference region, and

FIG. 7C is a diagram schematically illustrating a method for determining use pixels.

FIG. 8 is a block diagram illustrating a configuration of a corresponding point search processor according to a second embodiment.

FIG. 9 is a flowchart illustrating an operation of the corresponding-point search processor according to the second embodiment.

FIGS. 10A and 10B are diagrams schematically illustrating image data and FIG. 10C is a diagram schematically illustrating a method for determining degrees of reliability.

FIG. 20 is a flowchart illustrating an operation of the noise reduction processor.

DESCRIPTION OF THE EMBODIMENTS

Embodiments of the present disclosure will be described hereinafter with reference to the accompanying drawings. Configurations described in the embodiments below are merely examples and the present disclosure is not limited to the illustrated configurations.

Figure 1:
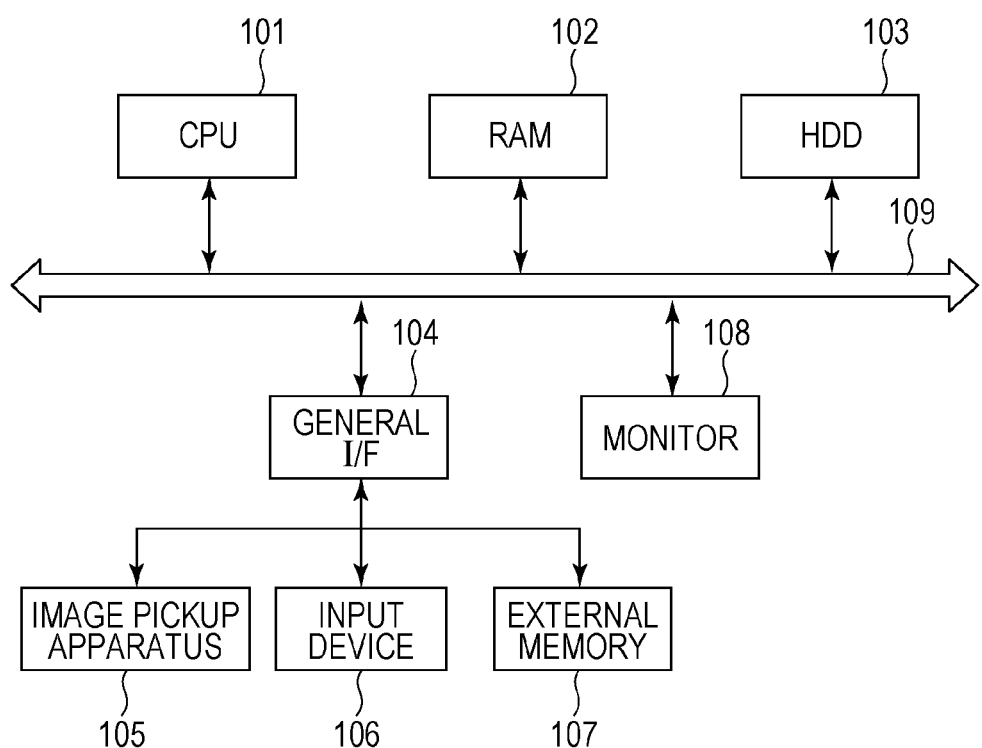
FIG. 1 is a block diagram illustrating a hardware configuration of an image processing apparatus.

FIG. 1 is a diagram illustrating a hardware configuration of an image processing apparatus applicable to a first embodiment. In this embodiment, a personal computer (PC) which performs various image processes on image data will be described as an example. Although the PC is used as an image processing apparatus as an example of this embodiment, the present invention is not limited to this. A mobile information processing apparatus, such as a tablet device or a smart phone, may be used as an image processing apparatus, or an image pickup apparatus, such as a digital still camera or a cellular phone including a camera, may incorporate hardware capable of executing image processes of this embodiment.

The image processing apparatus of this embodiment includes a central processing unit (CPU) 101, a random-access memory (RAM) 102, a hard disk drive (HDD) 103, a general interface (I/F) 104, a monitor 108, and a main bus 109. As used herein, the term "unit" generally refers to any combination of software, firmware, hardware or other component, such as circuitry, that is used to effectuate a purpose.

The general I/F 104 is used to connect the image processing apparatus and an external apparatus to each other. An image pickup apparatus 105 forms an image of a target of image capturing on an image pickup element using a lens incorporated in the image pickup apparatus 105 and converts light of the formed image into an electric signal so as to generate digital image data. Note that the image pickup element included in an image pickup region may have a small portion corresponding to a position having a pixel value which is not obtained as a result of image formation of the light of the target of the image capturing. For example, a defect pixel generated in a fabrication process or a pixel intentionally provided for a purpose other than the image capturing, such as an image plane phase difference pixel or a ranging pixel, is included in such a position. The image pickup apparatus 105 has information representing a specific position which does not have a pixel value expected to be obtained on the basis of the light of the image of the target of the image capturing formed on the image pickup element due to the reason described above. The image pickup apparatus 105 outputs digital image data obtained as a result of the image capturing.

An input device 106 is an external apparatus which accepts an instruction issued by a user using a mouse or a keyboard to the image processing apparatus. An external memory 107 corresponds to a memory card, for example. The general I/F 104 is used to connect the image pickup apparatus 105, the input device 106, and the external memory 107 to the main bus 109. Furthermore, the general I/F 104 may transmit data to and receive data from a communication apparatus using infrared communication or a wireless local area network (LAN).

The CPU 101 controls the units of the image processing apparatus in accordance with input signals and programs described below. The HDD 103 stores computer programs used by the CPU 101 to execute various types of software. The CPU 101 realizes various image processes of the image processing apparatus by activating the software (image processing applications) stored in the HDD 103. Although a case where the CPU 101 controls the entire apparatus is described as an example, the entire apparatus may be controlled by assigning the various image processes to a plurality of portions of hardware.

A random access memory (RAM) 102 temporarily stores image data to be processed and is used as a work space of the CPU 101. The monitor 108 displays the image data to be processed and user interfaces (UIs) for executing the image processes.

As described above, various data stored in the HDD 103 and the external memory 107, data of images captured by the image pickup apparatus 105, and instructions issued by the input device 106 are transferred to the RAM 102. Furthermore, the image data stored in the RAM 102 is to be subjected to various calculation processes in accordance with processes in an image processing application in response to instructions issued by the CPU 101. Results of the calculation processes are displayed in the monitor 108 or stored in the HDD 103 or the external memory 107. The image data stored in the HDD 103 or the external memory 107 may be transferred to the RAM 102. Furthermore, the image data transmitted from a server through a network, not illustrated, may be transferred to the RAM 102.

The various image processes executed by the CPU 101 will now be described. In this embodiment, a process of inputting a plurality of image data obtained from different viewpoints in accordance with an instruction issued by the CPU 101 and calculating a 3D position of a target of image capturing will be described in detail.

Stereo Vision Method

First, a stereo vision method will be described. In this technique, 3D information is restored using a plurality of images captured from different viewpoints. In the stereo vision method, positions of points on at least two images corresponding to certain space points of a target of image capturing which are projected on the images are specified. Specifically, one of the images is determined as a target image and the other of the images is determined as a reference image, and the reference image is searched for a point corresponds to a pixel in a certain position in the target image. In order to search the reference image for the point corresponding to the pixel in the certain position in the target image, a degree of similarity between a target pixel and a reference pixel is calculated. For the calculation of the degree of similarity, Expressions (1) and (2) below are used. Expression (1) represents a sum of absolute difference (SAD) and Expression (2) represents a sum of squared difference (SSD).

$$R_{SAD} = \sum_{j=0}^{N-1}\sum_{i=0}^{M-1} |I(i,j) - T(I,j)| \quad (1)$$

$$R_{SSD} = \sum_{j=0}^{N-1}\sum_{i=0}^{M-1} \{I(i,j) - T(I,j)\}^2 \quad (2)$$

In Expressions (1) and (2), a block size is denoted by "M×N", a pixel value of a pixel in a position (i, j) in one of blocks is denoted by I(i, j), and a pixel value of a pixel in a position (i, j) in the other of the blocks is denoted by T(i, j). According to Expressions (1) and (2), the degree of similarity between the target pixel and the reference pixel is determined as a result of a determination as to whether regions including the target pixel and the reference pixel are similar to each other. In a target region including the target pixel and a reference region including the reference pixel, when a sum of differences between pixel values of pixels corresponding to each other is small, it is determined that the target region and the reference region are similar to each other. Therefore, a pixel having the smallest values of $R_{SAD}$ and $R_{SSD}$ representing the degree of similarity is determined as a point of the reference image corresponding to the target pixel (i, j). To calculate 3D information representing a three-dimensional (3D) position of a target of image capturing with high accuracy, the corresponding point is required to be obtained with accuracy of a sub-pixel level. In this embodiment, the simplest method is illustrated.

Logical Configuration of Image Processing Apparatus

Figure 2:
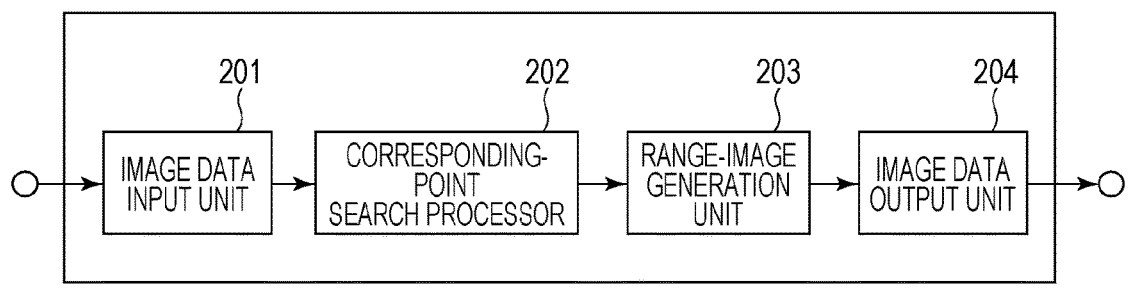
FIG. 2 is a block diagram illustrating a logical configuration of the image processing apparatus.

FIG. 2 is a block diagram illustrating a logical configuration of the image processing apparatus applicable to this embodiment. Processes of various processors are executed by the CPU 101. The image processing apparatus includes an image data input unit 201, a corresponding-point search processor 202, a range-image generation unit 203, and an image data output unit 204.

The image data input unit 201 inputs data of two images which are processing targets and which are captured from different viewpoints to the image processing apparatus. The image data is input from the image pickup apparatus 105, the HDD 103, or the external memory 107 in response to an instruction issued by the CPU 101. Data of an image captured by the image pickup apparatus 105 may be input after being stored in a storage device, such as the HDD 103. Hereinafter, in the data of the two images, data of one of the images serving as a base is referred to as a target image and data of the other of the images is referred to as a reference image.

The corresponding-point search processor 202 searches the reference image in the data of the two images input by the image data input unit 201 for a point corresponding to a point of the target image for each pixel. Data representing the searched corresponding point is stored in the RAM 102. The corresponding-point search processor 202 will be described in detail with reference to FIG. 3. A block-size setting unit 301 sets a size of a region used to calculate a degree of similarity between a target pixel and a reference pixel. The set block size is stored in the RAM 102. The block size is determined on the basis of a size of an object, density change, and image density.

A process below is executed for individual pixels included in the target image. A target pixel included in the target image to be processed is determined in order of raster. Furthermore, all pixels included in a reference image are set as reference pixels for each target pixel, and degrees of similarity between the target pixel and the reference pixels are calculated. A processing region obtaining unit 302 obtains a target region of the target image and the reference region of the reference image included in the image data input by the image data input unit 201 in accordance with the block size obtained from the RAM 102. Here, the target region includes a target pixel and peripheral pixels of the target pixel. Furthermore, the reference region includes a reference pixel to be referred to for a degree of similarity and peripheral pixels of the reference pixel. The target region and the reference region obtained by the processing region obtaining unit 302 are stored in the RAM 102.

A position obtaining unit 303 obtains positions of specific pixels included in the target region and the reference region obtained from the RAM 102. The obtained positions of the specific pixels are stored in the RAM 102. The specific pixels and the obtainment of the positions of the specific pixels will be described in detail hereinafter.

A use pixel determination unit 304 determines pixels to be used for calculation of a degree of similarity between the target region and the reference region. The use pixel determination unit 304 obtains the positions of the specific pixels from data stored in advance. The use pixel determination unit 304 determines use pixels used to calculate the degree of similarity between the target region and the reference region. The use pixel determination unit 304 stores the determined use pixels in the RAM 102. The use pixel determination unit 304 will be described in detail hereinafter.

A similarity-degree determination unit 305 obtains use pixels in the target region and the reference region on the basis of the use pixels determined by the use pixel determination unit 304. The similarity-degree determination unit 305 calculates the degree of similarity between the target region and the reference region using the obtained use pixels. In this embodiment, as illustrated in Expression (2), the degree of similarity is calculated in accordance with differences between values of pixels corresponding to each other.

A corresponding-point determination unit 306 determines a point corresponding to a point in the target image from among pixels of the reference image in accordance with the degrees of similarity calculated by the similarity-degree determination unit 305. Among all reference pixels in which the degrees of similarity are calculated, a pixel having the smallest value of a degree of similarity is determined as a point corresponding to the target pixel. The range-image generation unit 203 obtains data on the corresponding point output from the corresponding-point determination unit 306 and generates a range image according to the principle of triangulation. The generated range image data is stored in the RAM 102.

The image data output unit 204 outputs data on the range image generated by the range-image generation unit 203 to the monitor 108, the HDD 103, or the like. The output destination is not limited to these and the data may be output to the external memory 107 connected to the general I/F 104 or an external server, not illustrated, for example, or may be output to a connected printer.

Use Pixel Determination Unit 304

As described above, the use pixel determination unit 304 determines use pixels used to calculate the degree of similarity between the target region and the reference region in accordance with specific pixels. The specific pixel means a pixel located in a specific position which is highly possible to have a value different from a pixel value to be obtained by converting light which forms an image of a target of image capturing on the image pickup element using a lens incorporated in the image pickup apparatus 105 into an electric signal. Specifically, examples of the specific pixel include a defective pixel, a washed-out pixel and a blocked-up shadows pixel which exceed a limit of a dynamic range, a pixel disposed for a specific purpose, such as an image plane phase difference pixel, a temperature sensor pixel, or a ranging sensor pixel, and a pixel to which dirt or dust adheres. Among the examples of the specific pixel, a value of a defective pixel is normally replaced by a pixel value interpolated using pixel values of surrounding pixels by a defect correction process. Specifically, the value of the defective pixel is not a pixel value obtained by converting light forming an image of a target of image capturing by a lens into an electric signal in the image pickup apparatus 105. It is highly likely that a defective pixel generated due to a cosmic ray after shipment or a defective pixel which is surrounded by defective pixels particularly has a pixel value obtained after interpolation using surrounding pixels which is considerably different from an original pixel value.

Therefore, a pixel in image data corresponding to such a specific position on the image pickup element is defined as a specific pixel. Note that the specific pixel is not limited to the examples described above and may be arbitrarily defined as long as the specific pixel is a pixel in which it is likely that a reliable pixel value is not recorded. Furthermore, only a defective pixel may correspond to the specific pixel. Hereinafter, in this embodiment, a case where a defective pixel corresponds to the specific pixel will be described as an example.

In general, as for the defective pixel and the pixel disposed for a specific purpose, data representing a position of such a pixel in the image pickup element is stored in the image pickup apparatus 105 in advance. FIGS. 6A and 6B are diagrams illustrating data representing determinations as to whether each of pixels is a defective pixel. FIG. 6A is a diagram illustrating image data and FIG. 6B is a diagram illustrating defect information representing positions of defective pixels. Two pixels included in the image data illustrated in FIG. 6A are recognized as defective pixels. Accordingly, when the defective pixels are set as specific pixels, positions of the specific pixels in an image may be obtained using the defect information.

The positions of the specific pixels may be obtained by real-time estimation instead of use of the defect information. For example, when a specific pixel is a defective pixel, the specific pixel is detected by comparison with values of adjacent pixels. Specifically, a value of the target pixel is compared with values of pixels which are adjacent to the target pixel, and when the value of the target pixel is considerably different from the values of the adjacent pixels, the target pixel is determined as a defective pixel. Furthermore, a blocked-up shadows pixel or a washed-out pixel may be detected as a specific pixel by determining whether a pixel value of the pixel is a shadow-detail-loss value or an overexposure value. As described above, positions of specific pixels included in the target region and the reference region are obtained using the information stored in advance or by activating a certain detector.

In this embodiment, the specific pixel does not have a value to be obtained by forming an image of a target of image capturing, and therefore, the specific pixel is not used for the calculation of degrees of similarity between the target region and the reference region. This is because, in a case where block matching is performed, when a specific pixel is used for the calculation represented by Expression (1) or Expression (2), values of degrees of similarity become large due to the specific pixel even though the target region and the reference region are actually similar to each other. As a result, the regions which are similar to each other may not be detected as matching regions. Accordingly, when a specific pixel is included in the target region or the reference region, pixels other than the specific pixel are determined as use pixels. FIGS. 7A to 7C are diagrams illustrating determination of use pixels. FIGS. 7A and 7B are diagrams illustrating a target region of a target image and a reference region of a reference image. Here, pixels which do not include numeric values are specific pixels. In this embodiment, pixels in positions corresponding to specific pixels in at least one of the target region and the reference region are excepted from use pixels and not used for the calculation of the degree of similarity. FIG. 7C is a diagram illustrating use pixels. Pixels denoted by hatching represent the use pixels. By this, when the degrees of similarity between the target region and the reference region is actually small, miscalculation in which a large degree of similarity is obtained due to presence of the specific pixels is avoided.

Similarity-Degree Determination Unit 305

The similarity-degree determination unit 305 calculates the degree of similarity between the target region and the reference region using the use pixels determined by the use pixel determination unit 304. As described above, the similarity-degree determination unit 305 calculates the degree of similarity using the SAD illustrated in Expression (1) or the SSD illustrated in Expression (2). In this embodiment, since the degree of similarity is calculated only using the determined use pixels in the regions, Expression (3) or Expression (4) is used for calculating the degree of similarity.

$$R_{SAD} = \sum_{j=0}^{N-1} \sum_{i=0}^{M-1} E_{ij} |I(i, j) - T(I, j)| \tag{3}$$

s.t. $I(i, j) \neq$ SPECIFIC PIXEL,
$T(i, j) \neq$ SPECIFIC PIXEL $$R_{SSD} = \sum_{j=0}^{N-1} \sum_{i=0}^{M-1} E_{ij} \{I(i, j) - T(I, j)\}^2 \tag{4}$$

s.t. $I(i, j) \neq$ SPECIFIC PIXEL,
$T(i, j) \neq$ SPECIFIC PIXEL

In Expressions (3) and (4), when specific pixels are included in the target region and the reference region, results in positions of the specific pixels are not added to the degree of similarity.

The SAD and the SSD represent that the smaller a value representing the degree of similarity is, the larger the degree of similarity is. Here, when specific pixels are included in the target region and the reference region, since the number of differences to be added to one another for obtaining the degree of similarity is reduced, the degree of similarity is averagely smaller than an actual degree of similarity. An average degree of similarity R is proportional to the number of use pixels. Therefore, the degree of similarity is corrected in accordance with the number of pixels included in a block size set as the target region and the reference region and the number of use pixels. Assuming that a calculated degree of similarity is denoted by R, a corrected degree of similarity R' is obtained by Expression (5) where a block size is denoted by M×N (corresponding to the number of pixels included in the target region) and the number of use pixels is denoted by X.

$$R' = R \frac{MN}{X} \quad (5)$$

According to Expression (5), even when the specific pixels are included in the target region and the reference region, the degree of similarity to be calculated using all pixels may be obtained.

However, when the number of use pixels which is a denominator on the right border of Expression (5) is 0, that is, when pixels in all positions in at least one of the target region and the reference region are specific pixels, exception processing is performed. Specifically, when the number of use pixels is 0, a result obtained using Expression (1) or Expression (2) is determined as the degree of similarity R'. By this, the specific pixels in which reliable pixel values are not recorded are not used for calculation of the degree of similarity, and the degree of similarity using all pixels is calculated. However, when a large number of specific pixels are included, a value of the degree of similarity is considerably large. Accordingly, the number of use pixels is virtually 0, it is difficult to determine that the target region and the reference region match each other in accordance with a calculated degree of similarity.

Processing Flow

Figure 4:
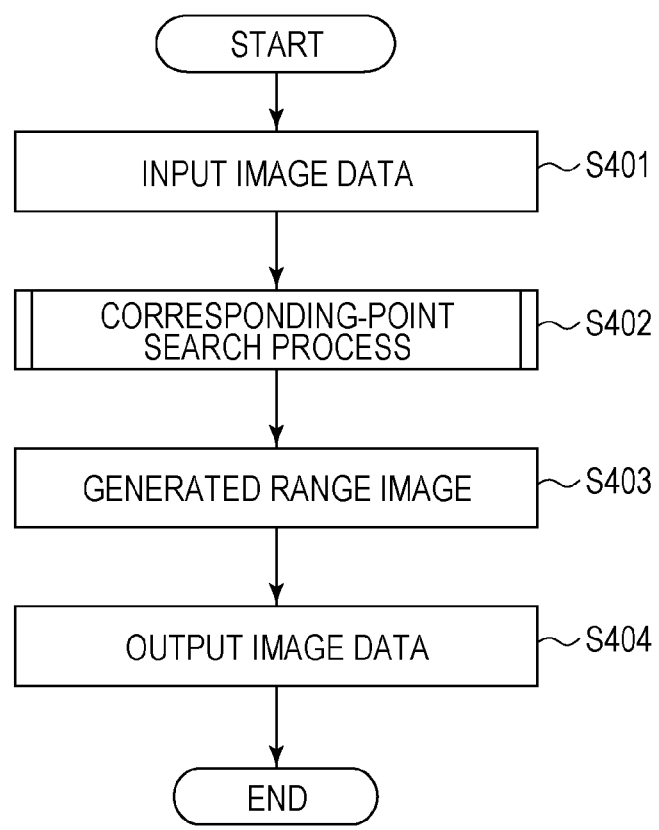
FIG. 4 is a flowchart illustrating an operation of an image process.

Hereinafter, a flow of an operation executed by the image processing apparatus of this embodiment will be described. FIG. 4 is a flowchart of an operation performed by the image processing apparatus of this embodiment. The CPU 101 realizes various processes by executing an application including a program of the flowchart described hereinafter.

In step S401, the image data input unit 201 inputs two image data captured from different viewpoints. As described above, one of the input two image data is a target image serving as a base and the other is a reference image. In step S402, the corresponding-point search processor 202 searches the reference image for points corresponding to points in the target image. The corresponding-point search process will be described hereinafter.

In step S403, the range-image generation unit 203 generates range-image data using information on the corresponding points obtained in step S402. In step S404, the image data output unit 204 outputs the range-image data generated in step S403.

Figure 3:
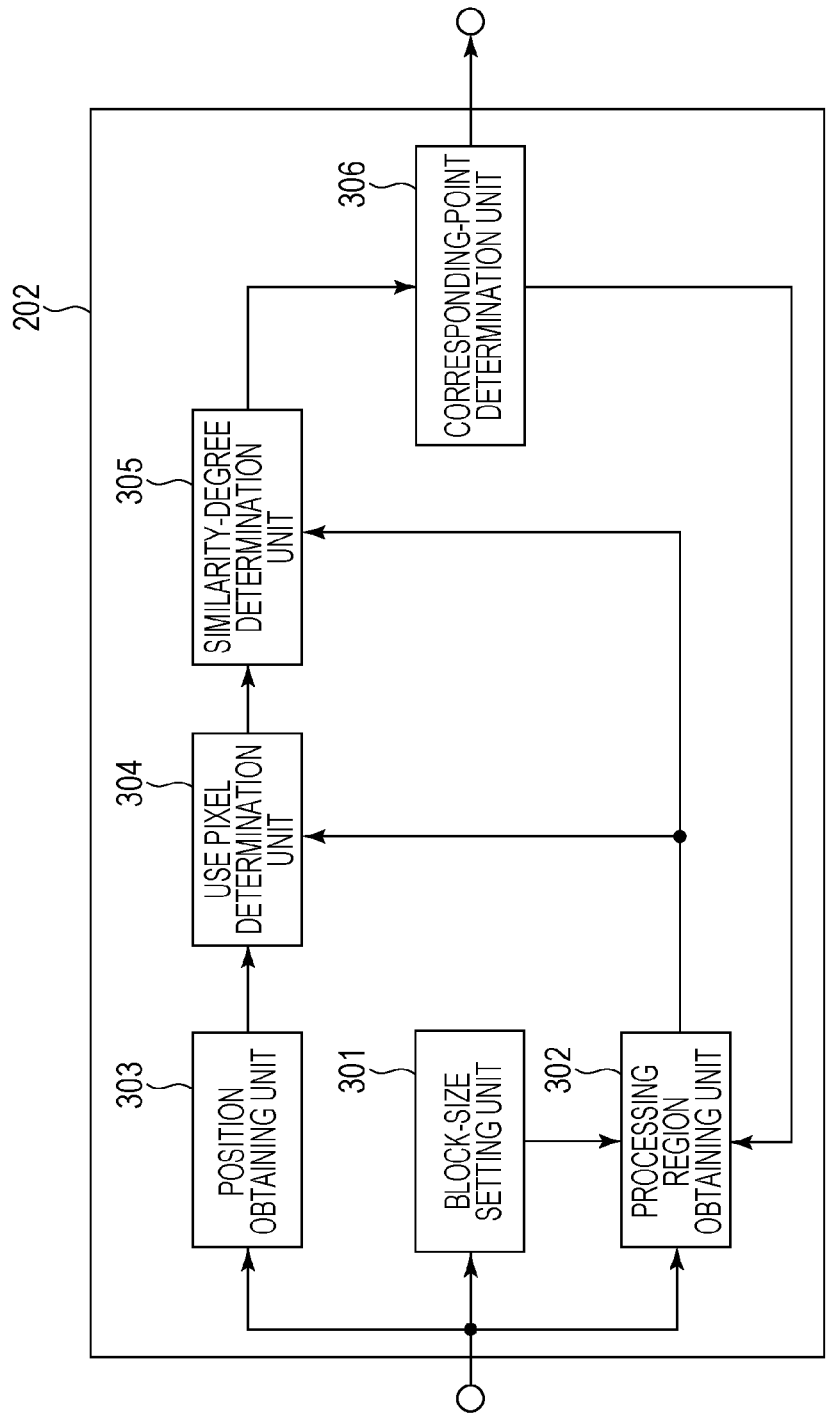
FIG. 3 is a block diagram illustrating a configuration of a corresponding-point search processor according to a first embodiment.
Figure 5:
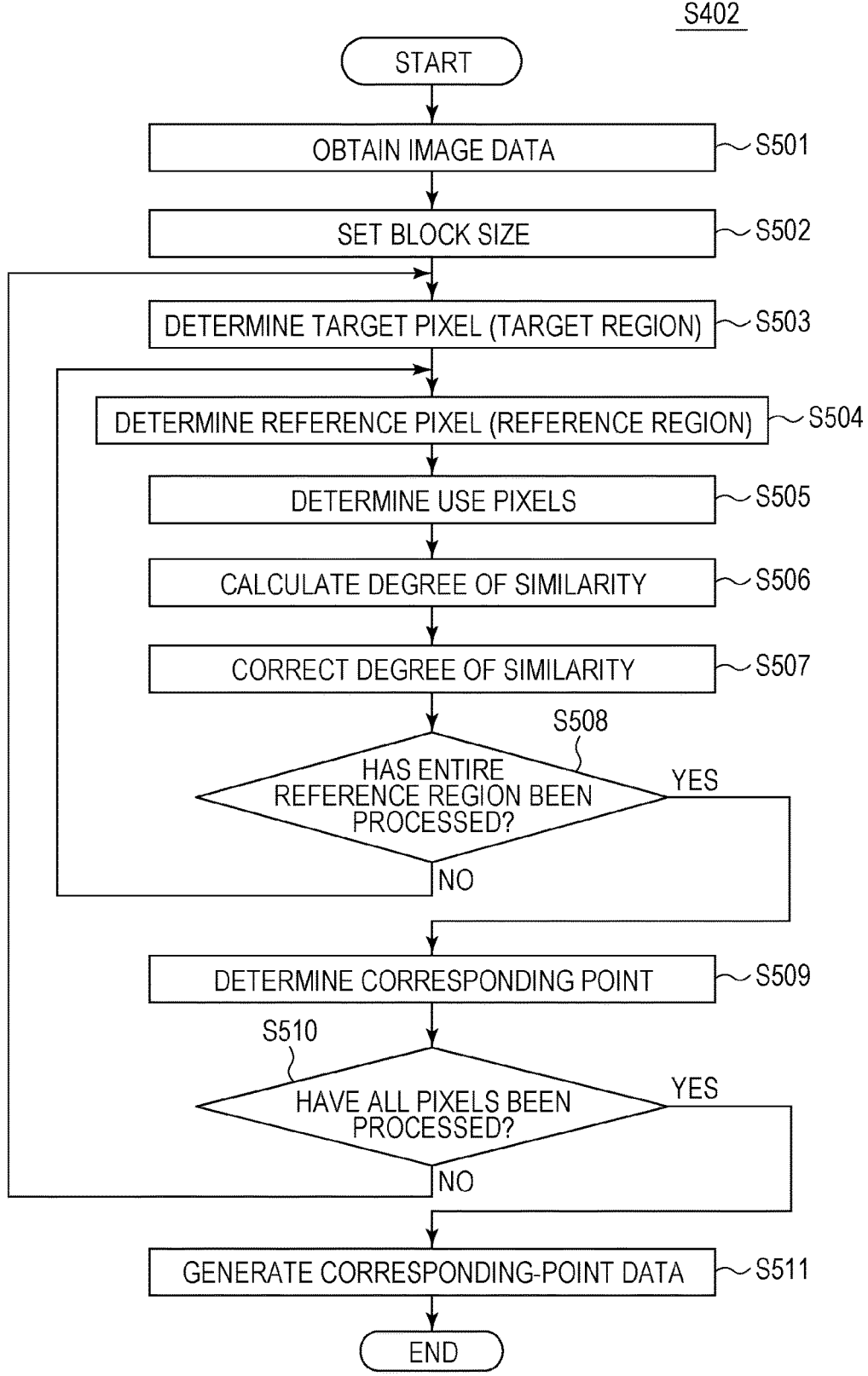
FIG. 5 is a flowchart illustrating an operation of the corresponding-point search processor according to the first embodiment.

Hereinafter, the corresponding-point search process performed in step S402 of FIG. 3 will be described with reference to a flowchart of FIG. 5. In step S501, the corresponding-point search processor 202 obtains the target image and the reference image input in step S401. In step S502, the block-size setting unit 301 sets a block size used for block matching for calculating a degree of similarity between a target pixel and a reference pixel. In this embodiment, a rectangular block size in a matrix of five rows and five columns is used. In step S503, the processing region obtaining unit 302 sets a target pixel in the target image in which a corresponding point is to be searched for and determines a target region in accordance with the block size set in step S502. In this embodiment, a pixel group including pixels in the matrix of five rows and five columns including the target pixel at a center is set as the target region. Note that all pixels included in the target image or a plurality of pixels extracted with a certain interval are sequentially set as the target pixel by raster scanning.

In step S504, the processing region obtaining unit 302 sets a pixel included in the reference image as the reference pixel and determines a reference region in accordance with the block size set in step S502. All pixels included in the reference image are sequentially set as the reference pixel by raster scanning. Accordingly, all the pixels included in the reference image are sequentially set as the reference pixel relative to a single target pixel. Furthermore, the reference region may be set on an epipolar line in the reference image. By this, an error and an amount of calculation at the time of matching may be reduced.

In step S505, the use pixel determination unit 304 obtains positions of specific pixels among the pixels included in the target region determined in step S503 and the reference region determined in step S504. Accordingly, when pixels which do not correspond to the specific pixels in both of the target region and the reference region are determined as use pixels. As described above, the use pixel determination unit 304 determines the pixels denoted by hatching in FIG. 7C as use pixels in accordance with the positions of the specific pixels included in the target region and the reference region illustrated in FIGS. 7A and 7B.

In step S506, the similarity-degree determination unit 305 calculates a degree of similarity between the target pixel and the reference pixel using only the use pixels determined in step S505. In this embodiment, the degree of similarity is calculated by the SSD in accordance with Expression (3).

In step S507, the similarity-degree determination unit 305 further corrects the degree of similarity calculated in accordance with the SSD in step S506 in accordance with Expression (5). In step S508, the corresponding-point determination unit 306 determines whether degrees of similarity between the set target pixel and all the pixels included in the reference image each of which serves as the reference pixel have been obtained. When the determination is affirmative, the process proceeds to step S509 whereas when the determination is negative, the process returns to step S504 where an unprocessed pixel is set as the reference pixel and the process is continued.

In step S509, the corresponding-point determination unit 306 determines a corresponding point relative to the target pixel. The corresponding-point determination unit 306 obtains the degrees of similarity between the target pixel and all the pixels included in the reference image in step S305. The corresponding-point determination unit 306 determines a position of a pixel having the smallest degree of similarity in the entire reference image as a corresponding point. Specifically, a reference pixel included in the reference region which matches the target region the most corresponds to a corresponding point.

In step S510, the corresponding-point determination unit 306 determines whether the corresponding-point search process has been performed on all the pixels included in the target image input in step S501. When the determination is affirmative, the process proceeds to step S511 whereas when the determination is negative, the process returns to step S503 where an unprocessed pixel is set as the target pixel and the process is continued. In step S511, the corresponding-point search processor 202 outputs data on corresponding points of the pixels determined in step S509. The corresponding-point search process is thus terminated.

As described above, according to this embodiment, a degree of similarity of the reference pixel relative to the target pixel is calculated using pixels other than the specific pixels by block matching. The specific pixels, such as defective pixels, have pixel values different from values to be obtained by forming an image of a target of image capturing. Therefore, a corresponding point similar to the target pixel may be detected with higher accuracy.

Although the range image is generated using the two images in this embodiment, the range image may be generated using three or more images captured from different viewpoints. In this case, a single target image and a plurality of reference images are input by the image data input unit 201, and each of the reference images is searched for a corresponding point relative to a target pixel of the target image.

In the embodiment described above, when a degree of similarity is determined, first, a degree of similarity of the reference pixel relative to the target pixel is calculated using pixels other than the specific pixels. In a second embodiment, a method for performing weighting in accordance with degrees of reliability of specific pixels will be described. Specifically, in this embodiment, degrees of similarity are determined in accordance with degrees of reliability of pixel positions of pixels in regions. Descriptions of configurations the same as those of the foregoing embodiment are omitted.

FIG. 8 is a block diagram illustrating a detailed configuration of a corresponding-point search processor 202 applicable to the second embodiment. The corresponding-point search processor 202 of this embodiment includes a block-size setting unit 801, a processing region obtaining unit 802, an information obtaining unit 803, a reliability-degree determination unit 804, a similarity-degree determination unit 805, and a corresponding-point determination unit 806. The block-size setting unit 801, the processing region obtaining unit 802, and the corresponding-point determination unit 806 are the same as the block-size setting unit 301, the processing region obtaining unit 302, and the corresponding-point determination unit 306, respectively.

The information obtaining unit 803 obtains information representing positions and types of specific pixels included in a target region and a reference region. The obtained information on the specific pixels is stored in a RAM 102. The types of specific pixels represent that each of the specific pixel is a defective pixel, a washed-out pixel, a blocked-up shadows pixel, a pixel provided for a special purpose, or a pixel to which dirt or dust adheres. The reliability-degree determination unit 804 determines degrees of reliability of the pixel positions in the target region and the reference region. The determination of the degrees of reliability will be described hereinafter.

The similarity-degree determination unit 805 obtains the target region, the reference region, and the degrees of reliability and calculates a degree of similarity between the target region and the reference region in accordance with the degrees of reliability. The determination of the degree of similarity will be described hereinafter.

Reliability-Degree Determination Unit 804

The degrees of reliability are parameters defined for the individual pixel positions in the target region and the reference region. The degrees of reliability mean degrees of reliability of differences between pixels in positions corresponding to each other to be reflected to the degree of similarity. FIGS. 10A to 10C are diagrams illustrating a method for determining the degrees of reliability. FIGS. 10A and 10B are diagrams illustrating information obtained by the information obtaining unit 803 in this embodiment. Here, pixels which do not include numeric numbers represent specific pixels. The terms "defective" and "saturation" represent the types of specific pixels, that is, a defective pixel and a washed-out pixel, respectively. FIG. 10C is a diagram illustrating degrees of reliability in the pixel positions set in accordance with the types of specific pixels. Degrees of reliability in pixel positions of normal pixels in both of the target region and the reference region are denoted by "1". On the other hand, when at least one of pixels in the target region and the reference region is a saturation pixel and the other is not a defective pixel, a degree of reliability in a position of the pixel is denoted by "0.5". Furthermore, when at least one of pixels in the target region and the reference region is a defective pixel, a degree of reliability in a position of the pixel is denoted by "0".

It is not necessarily the case that the degrees of reliability are set in a range from 0 to 1. Furthermore, when pixels do not have values obtained as results of image forming of a target of image capturing, degrees of reliability may be defined as any value as long as the degrees of reliability are set relatively small. Alternatively, when pixels corresponding to each other in positions in the target region and the reference region correspond to specific pixels, a smaller degree of reliability may be set. For example, when a certain pixel in the target region and a pixel in a corresponding position in the reference region are washed-out pixels, a degree of reliability may be determined as 0.3.

Note that degrees of reliability $E_{ij}$ in pixel positions in a certain region are represented by Expression (4). Here, it is assumed that a block size is denoted by "M×N", a pixel in the target region is denoted by "I", a pixel in the reference region is denoted by "T", and pixel positions are denoted by "i(i=0 to M−1)" and "j(j=0 to N−1)".

$$\begin{cases} E_{ij} = 1 & (I_{ij} \neq \text{SPECIFIC PIXEL}, T_{ij} \neq \text{SPECIFIC PIXEL}) \\ E_{ij} = 0.5 & (\text{WHEN } Iij \text{ AND } Tij \text{ SATISFY SPECIAL CONDITION}) \\ E_{ij} = 0 & (\text{otherwise}) \end{cases} \quad (6)$$

Expression (6) represents that 1 is set when pixels in the same position in the target region and the reference region are not specific pixels, 0.5 is set when a special condition is satisfied, and otherwise, 0 is set.

Similarity-Degree Determination Unit 805

To calculate the degree of similarity, the SAD illustrated in Expression (1) or the SSD represented by Expression (2) is used. In this embodiment, calculation is performed in accordance with Expression (7) or Expression (8) taking the degrees of reliability $E_{ij}$ into consideration.

$$R_{SAD} = \sum_{j=0}^{N-1} \sum_{i=0}^{M-1} E_{ij} |I(i, j) - T(I, j)| \quad (7)$$

$$R_{SSD} = \sum_{j=0}^{N-1} \sum_{i=0}^{M-1} E_{ij} \{I(i, j) - T(I, j)\}^2 \quad (8)$$

Expressions (7) and (8) mean that weighting is performed on the SAD and SSD, respectively, using the degrees of reliability $E_{ij}$. For example, in a case where the degrees of reliability $E_{ij}$ represented by Expression (6) are used, when either of pixels in a certain position in the target region and the reference region is not a specific pixel, the SAD or the SSD is directly added. Furthermore, when a certain condition is satisfied, a result of half of the SAD or the SSD is added, and otherwise, a result in the position is not added. As described above, as the degree of similarity is small, the target region and the reference region are similar to each other. Accordingly, when pixel positions in which the degrees of reliability $E_{ij}$ are not 1 exist, a calculation result is smaller than a normal value, that is, it is determined that the degree of similarity is high. Therefore, the degree of similarity is appropriately corrected in accordance with the degrees of reliability $E_{ij}$. Assuming that a calculated degree of similarity is R, a degree of similarity R' after the correction is obtained by Expression (9) below. Here, a block size is denoted by "M×N".

$$R' = R \frac{MN}{\sum_{j=0}^{N-1} \sum_{i=0}^{M-1} E_{ij}} \quad (9)$$

According to Expression (9), even when small weights are applied to portions corresponding to specific pixels using the degrees of reliability $E_{ij}$, a value of a degree of similarity to be obtained using all pixels may be obtained. Note that, when a sum total of weights serving as a denominator on the right border is 0, exception processing is performed. Specifically, a result obtained using Expression (1) or Expression (2) is determined as the degree of similarity R'. By this, the specific pixels in which reliable pixel values are not recorded are not used for calculation of a degree of similarity, and a degree of similarity using all pixels is calculated. However, when a large number of specific pixels are included, a value of the degree of similarity is considerably large. Accordingly, when the number of use pixels is virtually 0, it is difficult to determine that the target region and the reference region are similar to each other in accordance with a calculated degree of similarity.

Hereinafter, the corresponding-point search process in this embodiment will be described in detail. FIG. 9 is a flowchart of a process of the second embodiment. As with the foregoing embodiment, a CPU 101 executes various processes by executing an application including a program of the flowchart described hereinafter. A process from step S901 to step S904 is the same as the process from step S501 to step S504.

In step S905, the reliability-degree determination unit 804 obtains information on positions of specific pixels among the pixels included in the target region determined in step S903 and the reference region determined in step S904 and types of the specific pixels. Then degrees of reliability in the pixel positions are determined. In this embodiment, defective pixels, washed-out pixels, and blocked-up shadows pixels are detected as specific pixels. Furthermore, as illustrated in FIG. 10C, when a washed-out pixel or a blocked-up shadows pixel is detected in one of the target region and the reference region, a degree of reliability is set to 0.5, and when a defective pixel is detected in one of the target region and the reference region, a degree of reliability is set to 0.

In step S906, the similarity-degree determination unit 805 calculates a degree of similarity between the target region determined in step S903 and the reference region determined in step S904 in accordance with the degrees of reliability determined in step S905. In this embodiment, as represented by Expression (8), the SSD is multiplied by weights obtained depending on the degrees of reliability so that the degree of similarity is calculated.

In step S907, the similarity-degree determination unit 805 further corrects the degree of similarity in accordance with the SSD calculated in step S906 in accordance with Expression (9).

The process from step S908 to step S911 is the same as the process from step S508 to step S511.

The method for calculating the degree of similarity with higher accuracy using the degrees of reliability corresponding to the types of the specific pixels is described hereinabove. According to this method, the specific pixels which do not have pixel values obtained as results of image forming of a target of image capturing in image data may be reflected on the calculation of the degree of similarity in accordance with the types of specific pixels.

In the foregoing embodiment, the method for determining whether the pixels included in the block size determined in advance are to be used for the calculation of the degree of similarity by the corresponding-point search processor 202 has been described. In this case, a large number of specific pixels may be included in the target region and the reference region, and therefore, the number of use pixels may be small, or a large number of pixels may have low degrees of reliability. Although, in general, when a difference is small (that is, the target region and the reference region are similar to each other), a degree of similarity is small. However, if the number of use pixels is considerably small, a degree of similarity is small since the number of differences to be added to one another is small. Therefore, in a third embodiment, when a large number of specific pixels are included in a target region and a reference region, the target region and the reference region are obtained again after a block size is set. A method for calculating a degree of similarity using an efficient number of use pixels (or pixels having high degrees of reliability) in this way will be described.

Figure 11:
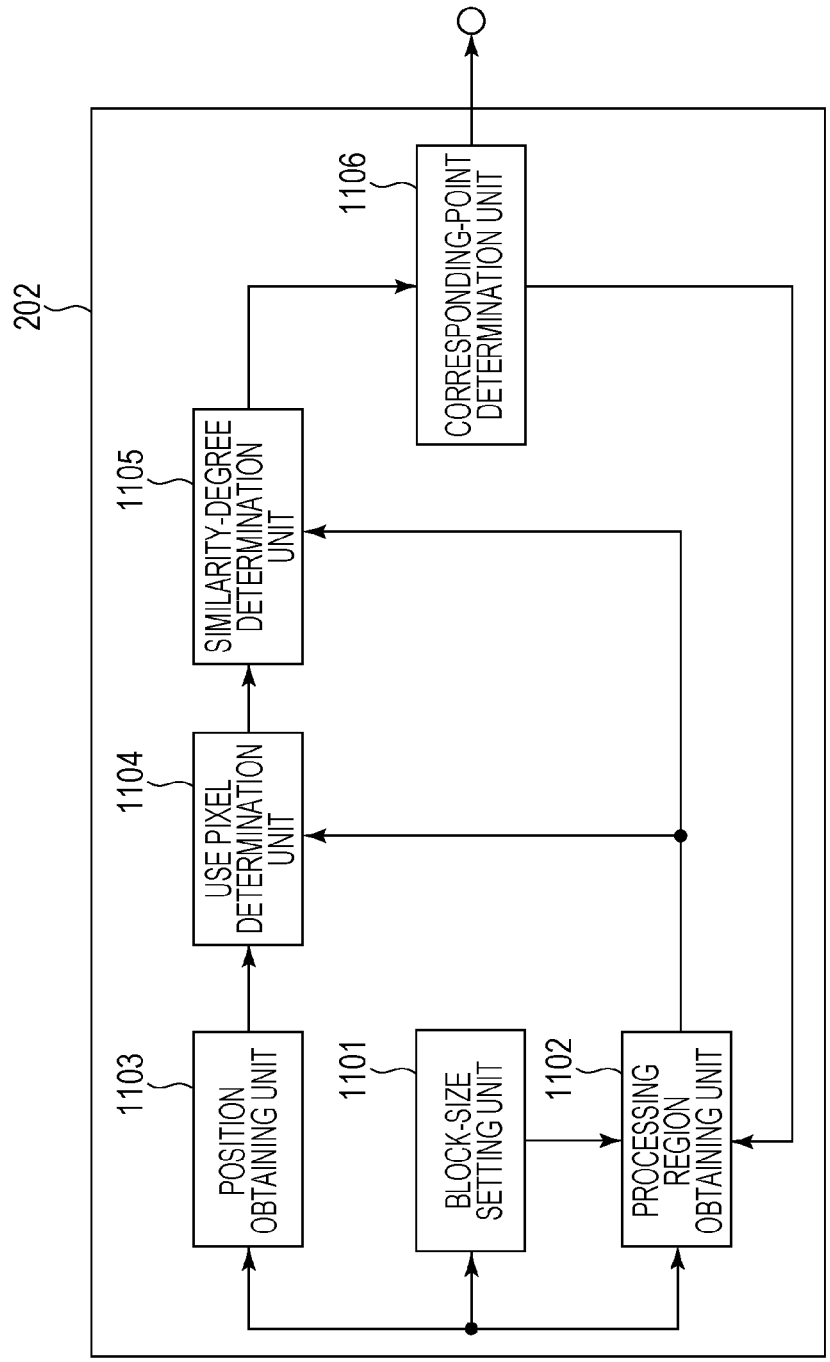
FIG. 11 is a block diagram illustrating a configuration of a corresponding point search processor according to a third embodiment.
Figure 12:
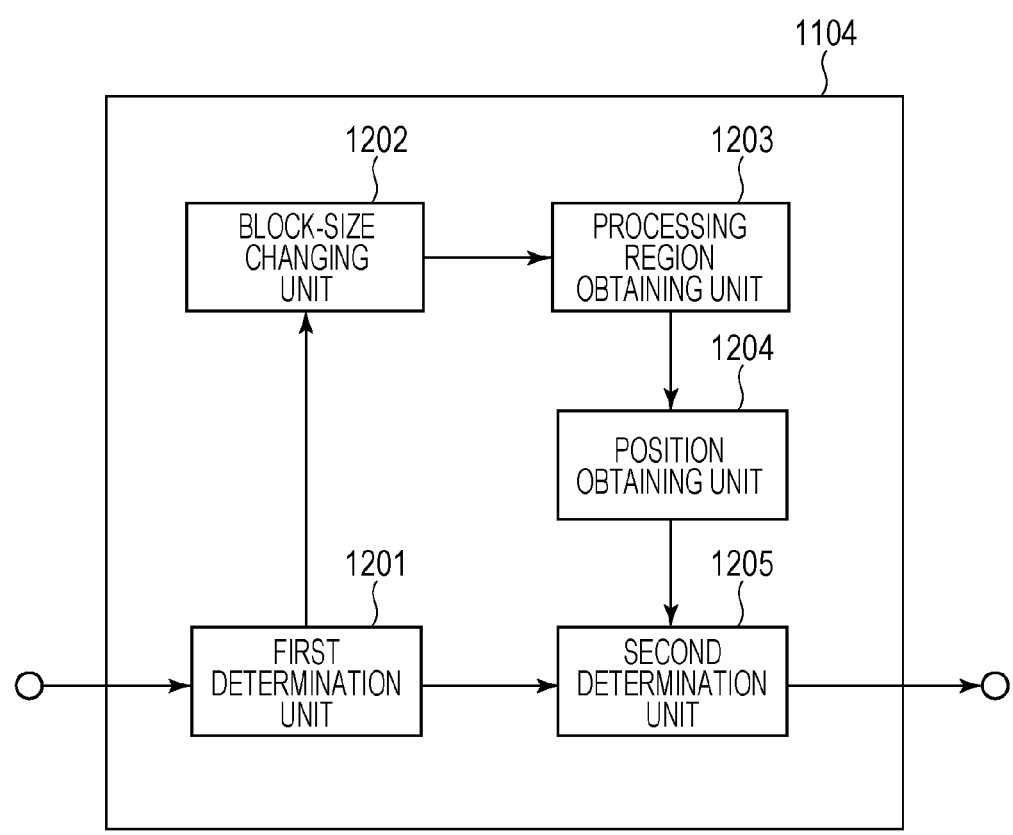
FIG. 12 is a block diagram illustrating a configuration of a use pixel determination unit.

FIG. 11 is a block diagram illustrating a detailed configuration of a corresponding-point search processor 202 applicable to the third embodiment. A block-size setting unit 1101, a processing region obtaining unit 1102, a position obtaining unit 1103, a similarity-degree determination unit 1105, and a corresponding-point determination unit 1106 correspond to the block-size setting unit 301, the processing region obtaining unit 302, the position obtaining unit 303, the similarity-degree determination unit 305, and the corresponding-point determination unit 306, respectively. FIG. 12 is a block diagram illustrating a detailed configuration of a use-pixel determination unit 1104 in the third embodiment. The use-pixel determination unit 1104 in this embodiment includes a first determination unit 1201, a block-size changing unit 1202, a processing region obtaining unit 1203, a position obtaining unit 1204, and a second determination unit 1205.

The first determination unit 1201 obtains positions of specific pixels included in a target region and a reference region. Then the first determination unit 1201 determines whether a ratio of pixels other than the specific pixels in both of the regions relative to pixels included in the individual regions is not smaller than a threshold value. The threshold value may be arbitrarily set. When the ratio is smaller than the threshold value, the first determination unit 1201 outputs a determined block size to the block-size changing unit 1202.

When the first determination unit 1201 determines that the ratio of the pixels other than the specific pixels in both of the regions relative to the pixels included in the individual regions is smaller than the threshold value, the block-size changing unit 1202 changes the block size determined by the first determination unit 1201 to a block size slightly larger than the block size determined by the first determination unit 1201. The changed block size is stored in the RAM 102.

The processing region obtaining unit 1203 obtains a target region of a target image and a reference region of a reference image by the image data input unit 201 in accordance with the block size changed by the block-size changing unit 1202. The processing region obtaining unit 1203 outputs the obtained target region and the obtained reference region to the position obtaining unit 1204. The position obtaining unit 1204 obtains positions of specific pixels included in the target region and the reference region obtained from the processing region obtaining unit 1203. The obtained positions of the specific pixels are output to the second determination unit 1205. As with the first embodiment, to obtain the specific pixels and the positions of the specific pixels, defect information is used in this embodiment.

The second determination unit 1205 determines use pixels used for calculation of a degree of similarity on the basis of the specific pixels obtained by the position obtaining unit 1204 in the target region and the reference region obtained by the processing region obtaining unit 1203. The determined use pixels are stored in the RAM 102. The determination of the use pixels is performed similarly to the first embodiment.

Figure 13:
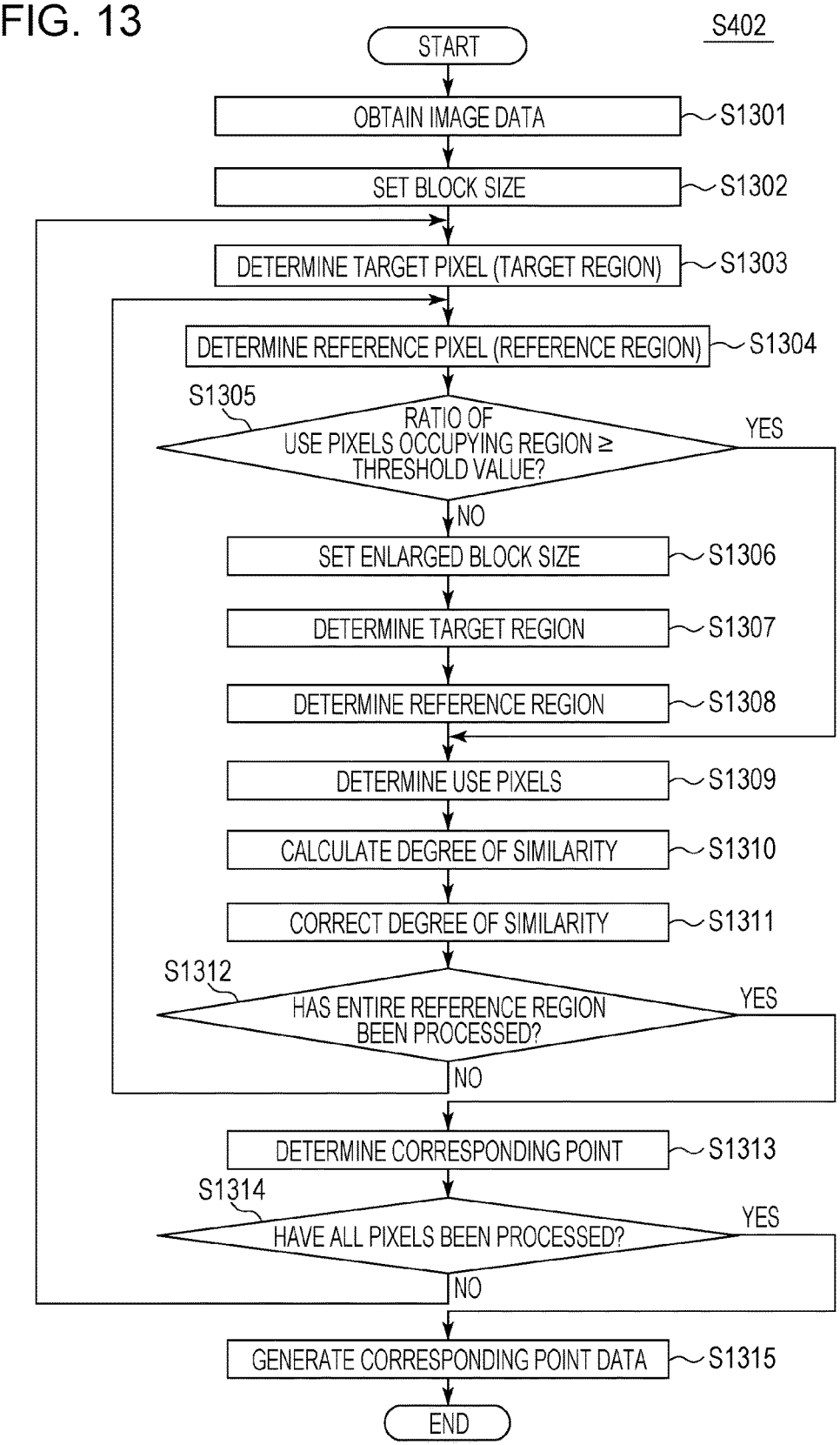
FIG. 13 is a flowchart illustrating an operation of the corresponding-point search processor according to the third embodiment.

Hereinafter, a flow of a corresponding-point search process of this embodiment will be described. FIG. 13 is a flowchart illustrating the corresponding-point search process applicable to the third embodiment. A process from step S1301 to step S1304 is the same as the process from step S501 to step S504.

In step S1305, the first determination unit 1201 obtains positions of specific pixels included in the target region and the reference region. Then, the first determination unit 1201 determines whether a ratio of pixels (candidates of use pixels) other than the specific pixels in both of the target region and the reference region relative to the numbers of pixels (a block size) included in the individual regions is equal to or larger than a threshold value. When the ratio is equal to or larger than the threshold value, the use pixel candidates are determined as use pixels and the process proceeds to step S1309. When the ratio is smaller than the threshold value, the process proceeds to step S1306.

In step S1306, the block-size changing unit 1202 expands the block size set in step S1302 to a slightly-larger block size. To determine regions including the target pixel and the reference pixel in centers, a block size in a matrix of odd-numbered rows and odd-numbered columns is set. Accordingly, when the block size set in step S1302 is in a matrix of odd-numbered rows and odd-numbered columns, the expanded block size is a matrix of odd-numbered rows and odd-numbered columns larger than the block size set in step S1302 by one unit. For example, when the block size set in step S1302 is a matrix of 3 rows and 3 columns, the expanded block size is a matrix of 5 rows and 5 columns.

In step S1307, the processing region obtaining unit 1203 obtains a target region on the basis of the expanded block size for the target pixel determined in step S1303. In step S1308, the processing region obtaining unit 1203 obtains a reference region on the basis of the expanded block size for the reference pixel determined in step S1304. The process from step S1309 to step S1315 is the same as the process from step S505 to step S511.

By the process described above, even when the number of use pixel candidates is small in a preset block size in the target region and the reference region, a degree of similarity may be calculated using a sufficient number of use pixels. Consequently, an excellent noise reduction effect may be obtained. In this embodiment, a method for obtaining positions of specific pixels and determining use pixels is described. However, as with the second embodiment, a method for calculating a degree of similarity on the basis of degrees of reliability of pixel positions in the regions may be employed.

Although the number of use pixels is controlled by expanding a block size in this embodiment, the present disclosure is not limited to this. For example, the number of use pixels used for calculation of a degree of similarity and determination order of neighborhood pixels of the target pixel are determined in advance. It is determined whether each of target pixels and reference pixels is a specific pixel in the determined order, and when a specific pixel is not detected in the pixels, the pixels may be determined as use pixels.

In the foregoing embodiments, image processing which executes the stereo vision method for searching for a corresponding point between images captured from different viewpoints by the block matching has been described. In a fourth embodiment, a case where a noise reduction process is performed by the block matching will be described as an example. A basic hardware configuration of an image processing apparatus of the fourth embodiment is the same as those of the foregoing embodiments.

In this embodiment, a process of inputting image data to an image processing application in response to an instruction issued by the CPU 101 so that image data in which noise is reduced is generated, and outputting the image data will be described in detail.

Non Local Means

First, a noise reduction process referred to as "Non Local Means" will be descried. In this method, degrees of similarity between a target pixel of image data to be subjected to noise reduction and a plurality of reference pixels are calculated by the block matching. A pixel value of the target pixel is replaced by a result of weighted average using pixel values of the reference pixels and weights depending on the degrees of similarity so that noise of the target pixel is reduced. Assuming that the number of reference pixels is denoted by $N_S$, pixel values of the reference pixels are denoted by $I_j$ ($j=1$ to $N_S$), and weights of the reference pixels are denoted by $w_j$ ($j=1$ to $N_S$), a pixel value $I_{new}$ of the target pixel after the weighted average performed for the noise reduction process is represented by Expression (10).

$$I_{new} = \frac{\sum_{j=1}^{N_S} w_j \times I_j}{\sum_{j=1}^{N_S} w_j} \tag{10}$$

Figure 14A:
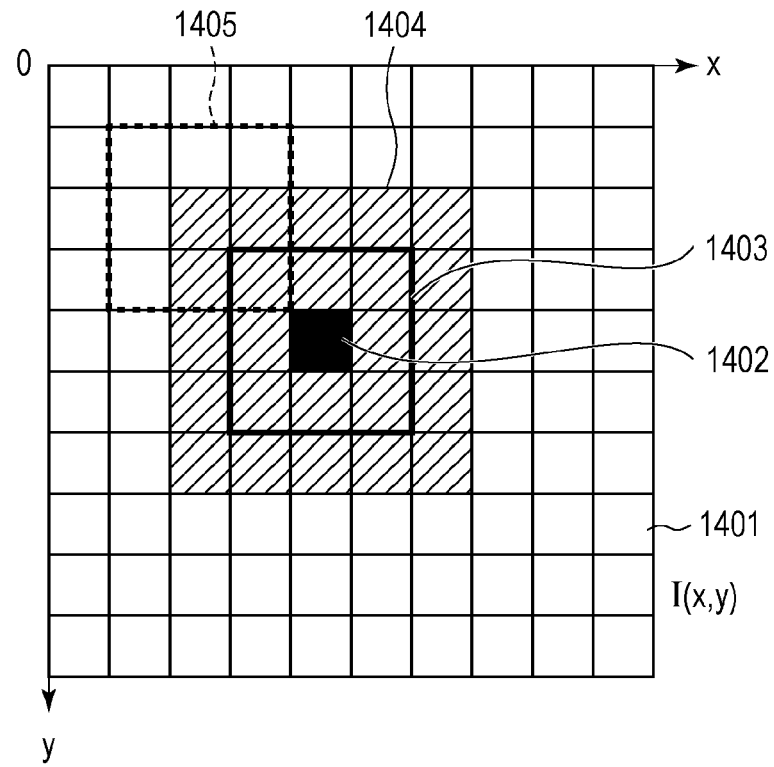
FIG. 14A is a diagram illustrating image data.
Figure 14B:
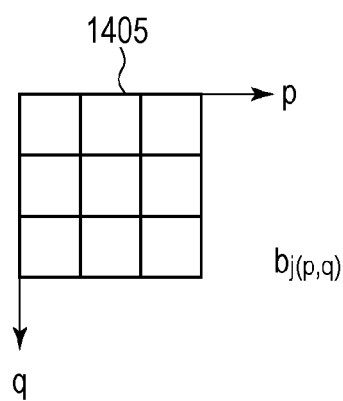
FIG. 14B is a diagram illustrating a reference region.
Figure 14C:
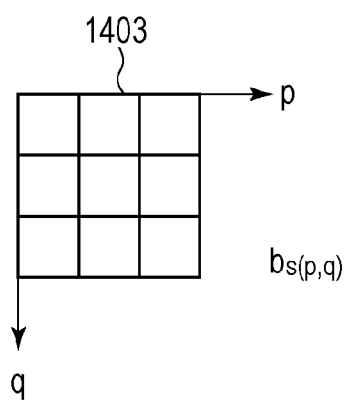
FIG. 14C is a diagram illustrating a target region.
Figure 15:
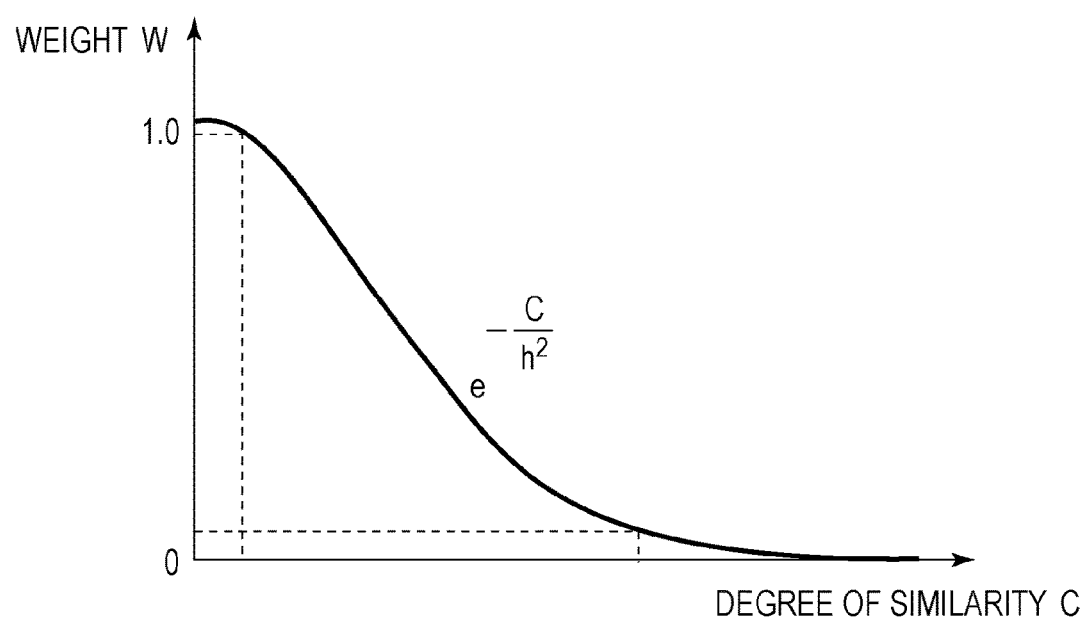
FIG. 15 is a graph illustrating a weight relative to a degree of similarity.

Next, a method for determining weights of the reference pixels will be described with reference to FIGS. 14A to 14C and FIG. 15. In FIG. 14A, image data 1401 represents an image to be processed. In the image data 1401, a pixel in an upper left is set as a point of origin, and pixel values of pixels are represented by I(x, y). Assuming that a pixel 1402 is set as a target pixel, a pixel value of the target pixel is represented as I(4, 4). A region 1403 is a target region which is a rectangular region in a matrix of 3 rows and 3 columns including the target pixel 1402 at the center. A reference pixel group 1404 represents reference pixels used for noise reduction of the target pixel and is formed by a rectangular region in a matrix of 5 rows and 5 columns ($N_S=25$) including the target pixel 1402. A region 1405 is a reference region of a reference pixel I(2, 2) including the reference pixel I(2, 2) at the center and is a rectangular region in a matrix of 3 rows and 3 columns which is the same size as the target region. Although a reference region is set for each reference pixel, only the reference region for the reference pixel I(2, 2) is illustrated in this embodiment. To obtain a weight of the reference pixel I(2, 2), first, the target region 1403 and the reference region 1405 of the reference pixel I(2, 2) are compared with each other so that a degree of similarity is determined. In this embodiment, as illustrated in FIGS. 14B and 14C, pixels in the reference region 1405 are denoted by $b_j(p, q)$ (j=1 to $N_S$) and pixels in the target region 1403 are denoted by $b_s(p, q)$. Pixel positions of the pixels in the target region 1403 and pixel positions of the pixels in the reference region 1405 correspond to each other. Assuming that differences between pixels spatially correspond to each other between the target region 1403 and the reference region 1405 are set as degrees of similarity, degrees of similarity $C_j$ is represented by Expression (11) below.

$$C_j = \sum_p \sum_q \{b_j(p, q) - b_s(p, q)\}^2 \quad (11)$$

As for the degrees of similarity $C_j$, as a value of a degree of similarity $C_j$ is small, the target region and the reference region is similar to each other. Therefore, weights of the reference pixels are determined in accordance with the degrees of similarity $C_j$. The weights are determined by a function illustrated in FIG. 15. As the degree of similarity $C_j$ is small, a weight is large whereas as the degree of similarity $C_j$ is large, a weight is small. This is represented by Expression (12).

$$w_j = \exp\left(-\frac{C_j}{h^2}\right) \quad (12)$$

Here, "h" denotes a variable which controls a magnitude of a weight, and as "h" becomes larger, a weight $w_j$ becomes larger. Therefore, although a high noise reduction effect is obtained when "h" is large, an edge becomes blurred.

Similarly, the target region 1403 is sequentially compared with each of the reference regions of the reference pixels so that weights of the reference pixels may be obtained.

In the noise reduction process of this embodiment, weights of the reference pixels are determined in accordance with degrees of similarity between the target region and the reference regions. A method for determining degrees of similarity and a method for determining weights are not limited to the methods described here. For example, the degrees of similarity may be calculated by the SAD as represented by Expression (13).

$$C_j = \sum_p \sum_q |b_j(p, q) - b_s(p, q)| \quad (13)$$

Logical Configuration of Image Processing Apparatus

Figure 16:
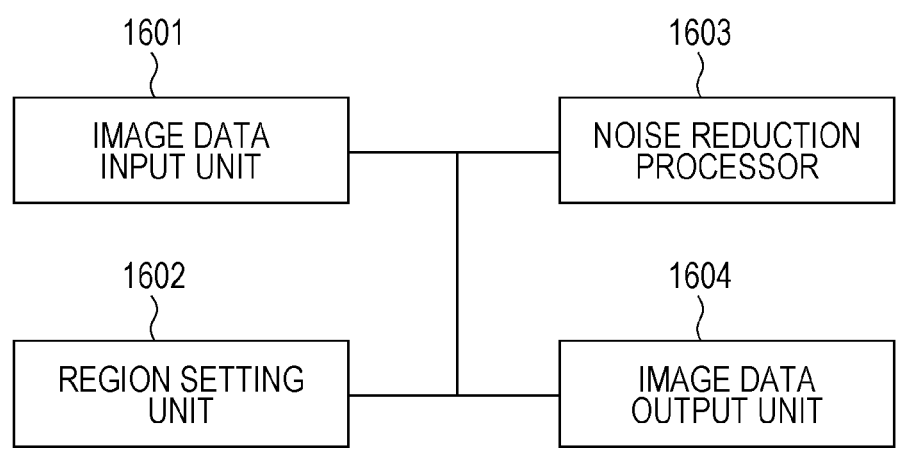
FIG. 16 is a flowchart illustrating a logical configuration of an image processing apparatus.

FIG. 16 is a diagram illustrating a logical configuration of the image processing apparatus applicable to this embodiment. In FIG. 16, the image processing apparatus includes an image data input unit 1601, a region setting unit 1602, a noise reduction processor 1603, and an image data output unit 1604. As with the foregoing embodiments, the processing units are controlled by a CPU 101 so as to execute various processes. The image data input unit 1601 inputs image data to the image processing apparatus. The image data is input from an image pickup apparatus 105, an HDD 103, or an external memory 107. Data of an image captured by the image pickup apparatus 105 may be input after being stored in a storage device, such as the HDD 103.

The region setting unit 1602 inputs a region parameter used for the noise reduction process to the noise reduction processor 1603. The region parameter is input from the HDD 103 or the external memory 107. Alternatively, the region parameter may be directly specified using the input device 106 such as a keyboard or a mouse through a user interface (UI). The region parameter will be described in detail hereinafter.

The noise reduction processor 1603 obtains the image data input by the image data input unit 1601. Then the noise reduction process is performed for each pixel of the image data so that correction image data in which noise is reduced is generated. The generated correction image data is stored in the RAM 102.

Figure 17:
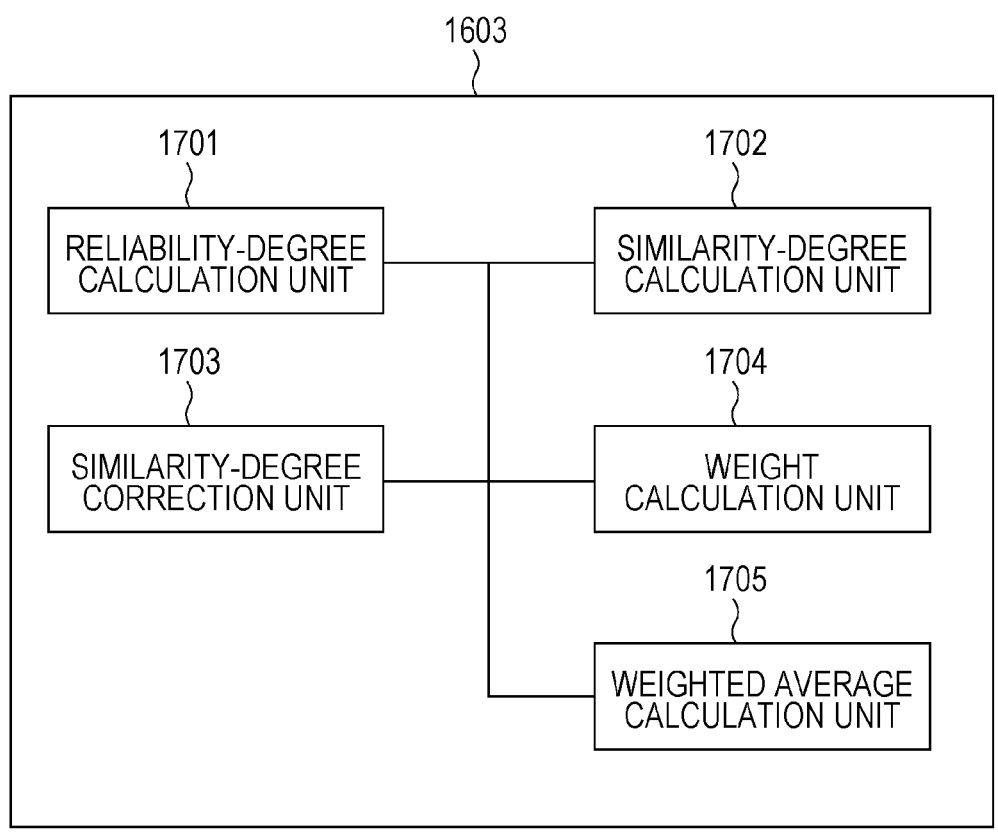
FIG. 17 is a block diagram illustrating a logical configuration of a noise reduction processor according to a fourth embodiment.

FIG. 17 is a block diagram illustrating a configuration of the noise reduction processor 1603 in detail. The noise reduction processor 1603 includes a reliability-degree calculation unit 1701, a similarity-degree calculation unit 1702, a similarity-degree correction unit 1703, a weight calculation unit 1704, and a weighted average calculation unit 1705. The reliability-degree calculation unit 1701 obtains the input image data and obtains information on positions and types of specific pixels included in pixels in the target region to be processed and the reference region. Then degrees of reliability in the pixel positions are determined. In this embodiment, defective pixels are obtained as the specific pixels. Furthermore, in the target region and the reference region, when either of pixels corresponding to each other is not a specific pixel, a degree of reliability is 1 whereas when at least one of the pixels corresponding to each other is a specific pixel, a degree of reliability is 0.

The similarity-degree calculation unit 1702 obtains the input image data, the region parameter, and the degrees of reliability so as to calculate a degree of similarity between the target region and the reference region. The similarity-degree correction unit 1703 corrects the degree of similarity calculated by the similarity-degree calculation unit 1702 in accordance with the degrees of reliability. The similarity-degree calculation unit 1702 and the similarity-degree correction unit 1703 will be described in detail hereinafter.

The weight calculation unit 1704 obtains the image data, the region parameter, and corrected degrees of similarity and calculates weights in accordance with the degrees of similarity. The weighted average calculation unit 1705 obtains the image data, the region parameter, and the weights of the reference pixels and generates correction image data. The image data output unit 1604 outputs the correction image data generated by the noise reduction processor 1603 to the monitor 108, the HDD 103, or the like. The output destination is not limited to these and the data may be output to the external memory 107 connected to a general I/F 104 or an external server, not illustrated, for example, or may be output to a connected printer.

Similarity-Degree Calculation Unit 1702 and Similarity-Degree Correction Unit 1703

The similarity-degree calculation unit 1702 calculates the degrees of similarity $C_j$ in accordance with the degrees of reliability obtained from the reliability-degree calculation unit 1701. First, the degrees of reliability in this embodiment may be represented by Expression (14). Here, the degrees of reliability are denoted by "$E_{pq}$".

$$\begin{cases} E_{pq} = 1 & (b_j(p, q) \neq \text{SPECIFIC PIXEL}, b_s(p, q) \neq \text{SPECIFIC PIXEL}) \\ E_{pq} = 0 & (\text{otherwise}) \end{cases} \quad (14)$$

The similarity-degree calculation unit 1702 calculates the degrees of similarity $C_j$ in accordance with the SSD between pixels corresponding to each other in accordance with the degrees of reliability $E_{pq}$ as represented by Expression (15).

$$C_j = \sum_p \sum_q E_{pq} \{b_j(p, q) - b_s(p, q)\}^2 \quad (15)$$

Furthermore, the similarity-degree correction unit 1703 corrects the degrees of similarity $C_j$ in accordance with the degrees of reliability $E_{pq}$. Assuming that a block size of the target region and the reference region is denoted by M×N, corrected degrees of similarity $C_j'$ may be obtained by the following expression.

$$C_j' = C_j \frac{MN}{\sum_p \sum_q E_{pq}} \quad (16)$$

The corrected degrees of similarity $C_j'$ are output to the weight calculation unit 1704.

Main Processing Flow

Figure 18:
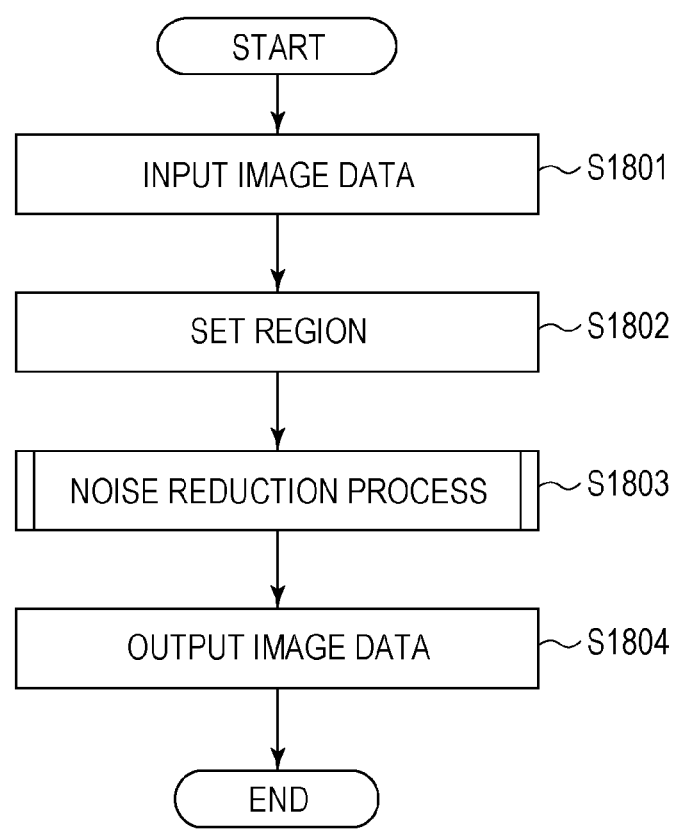
FIG. 18 is a flowchart illustrating an operation of the noise reduction processor according to the fourth embodiment.

Hereinafter, a flow of a process performed by the image processing apparatus of this embodiment will be described. FIG. 18 is a flowchart illustrating an image process of this embodiment. As with the foregoing embodiments, the CPU 101 executes various processes by executing an application including a program of the flowchart described below.

In step S1801, the image data input unit 1601 inputs image data. In step S1802, the region setting unit 1602 inputs an image processing parameter. The region parameter is input here as the image processing parameter. The region parameter will now be described. As illustrated in Expressions (10) to (12), to obtain pixel values after noise reduction, a target region used to determine degrees of similarity between a target pixel and reference pixels is determined. When the target region is determined, reference regions corresponding to the reference pixels are also determined. Therefore, in this embodiment, the region parameter represents pixel arrangements of the reference pixels and the target region. The reference pixels may be pixels in the vicinity of the target pixel or may be pixels in an entire image. Hereinafter, it is assumed that pixels in a matrix of 5 rows and 5 columns including the target pixel at the center correspond to reference pixels. In general, when the number of reference pixels is increased, a noise reduction effect is improved. However, a processing time is also increased. Therefore, the reference pixels are input as a region parameter depending on a desired embodiment.

Figure 19A:
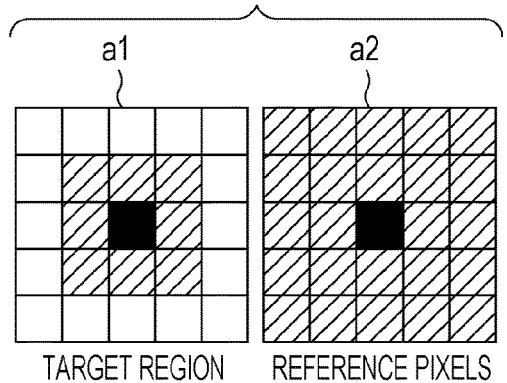
FIGS. 19A to 19F are diagrams illustrating target regions and reference pixels.
Figure 19B:
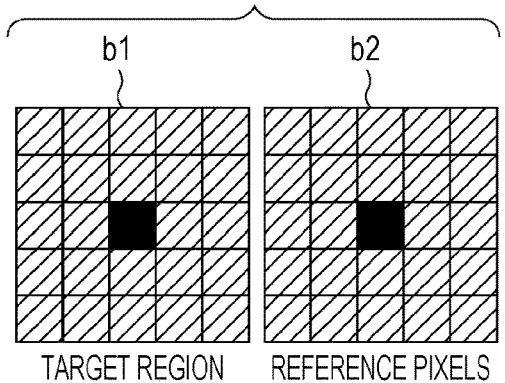
Figure 19C:
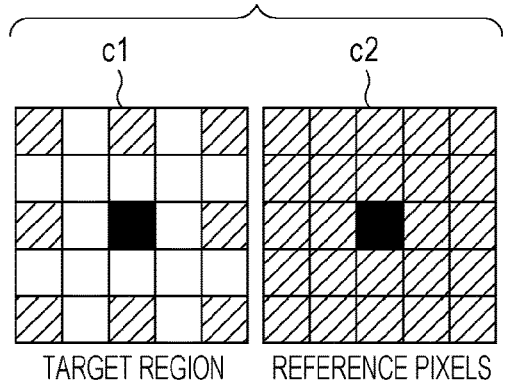
Figure 19D:
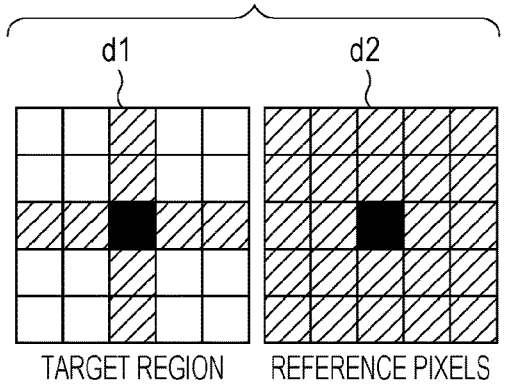
Figure 19E:
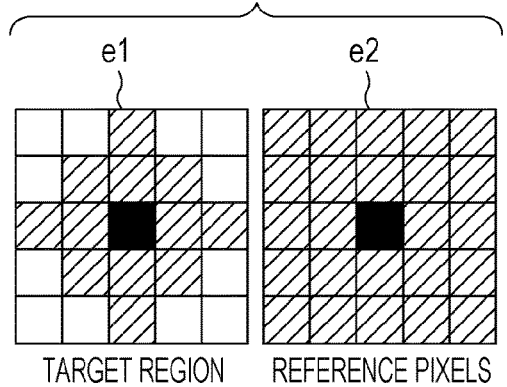
Figure 19F:
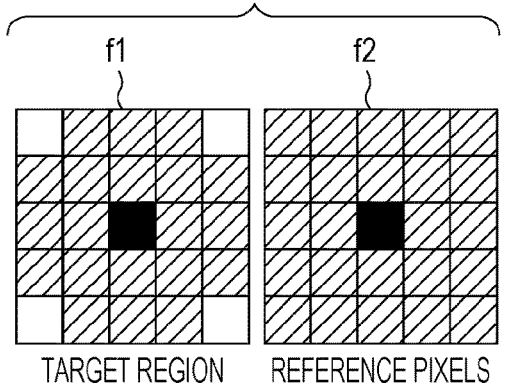

In general, when the target region is enlarged, a noise reduction effect in a solid portion becomes large whereas when the target region is reduced, a noise reduction effect in an edge portion becomes large, and accordingly, an appropriate target region is input as the region parameter depending on a desired embodiment. Here, examples of the target region are described with reference to FIGS. 19A to 19F. FIGS. 19A to 19F are diagrams schematically illustrating a plurality of sets of a target region and a plurality of reference pixels designated as the region parameters. In FIGS. 19A to 19F, black pixels represent the target pixel. In right portions in FIGS. 19A to 19F, a black pixel and pixels denoted by hatching represent a target region, and in left portions in FIGS. 19A to 19F, a black pixel and pixels denoted by hatching represent reference pixels. The sets illustrated in FIGS. 19A to 19F are examples of the region parameter. FIG. 19A includes a diagram illustrating a target region a1 including pixels in a matrix of 3 rows and 3 columns, and FIG. 19B includes a diagram illustrating a target region b1 including pixels in a matrix of 5 rows and 5 columns. The numbers of pixels in the target region a1 of FIG. 19A and the target region b1 of FIG. 19B are different from each other. Furthermore, FIG. 19C includes a diagram illustrating a target region c1 including pixels in a matrix of 3 rows and 3 columns with an interval of one pixel between the pixels including the target pixel at the center. FIG. 19D includes a diagram illustrating a target region d1 including five pixels in a vertical direction and five pixels in a horizontal direction with the target pixel at the center. The target region a1 of FIG. 19A, the target region c1 of FIG. 19C, and the target region d1 of FIG. 19D have the same number of pixels. However, pixel arrangements in the target regions are different from one another. The pixel arrangement of the target region is not limited to these, and desired arrangement may be employed. For example, FIG. 19E includes a diagram illustrating a target region e1 within a Manhattan distance of 2 or less from the target pixel. FIG. 19F includes a diagram illustrating a target region f1 within a Euclidian distance of $\sqrt{5}$ or less from the target pixel. In this way, a plurality of target regions having different distances from the target pixel may be input as a plurality of region parameter. Although a range of the target region and a range of the reference pixels are represented by squares for convenience sake, the present disclosure is not limited to this, and a rectangle or other shapes may be employed. In this way, various types of target region may be considered depending on the number of pixels included in the region or pixel arrangement.

In step S1803, the noise reduction processor 1603 performs the noise reduction process so as to generate correction image data. A flow of the noise reduction process will be described in detail below. In step S1804, the image data output unit 1604 outputs the correction image data generated in step S1803.

Flow of Noise Reduction Process

Hereinafter, a flow of the noise reduction process in step S1803 will be described with reference to a flowchart of FIG. 20.

In step S2001, the noise reduction processor 1603 obtains the image data input by the image data input unit 1601 in step S1801.

In step S2002, the noise reduction processor 1603 obtains the region parameter input by the region setting unit 1602 in step S1802. It is assumed here that a parameter for setting a rectangular region including pixels in a matrix of 3 rows and 3 columns illustrated in FIG. 10A as a target region is input. Furthermore, a parameter representing a reference pixel group used for weighted average is also input.

In step S2003, the noise reduction processor 1603 determines a target pixel and a target region in image data in accordance with the region parameter obtained in step S2002. In step S2004, the noise reduction processor 1603 determines reference pixels and a reference region in the image data in accordance with the region parameter obtained in step S2002.

In step S2005, the reliability-degree calculation unit 1701 determines degrees of reliability of pixels included in the target region and the reference region for individual pixel positions. It is assumed that, in this embodiment, as with the foregoing embodiments, the degrees of reliability are determined using Expression (14). Specifically, a degree of reliability in a pixel position in which at least one of a pixel in the target region and a pixel in the reference region is a specific pixel is 0. Furthermore, a degree of reliability in a pixel position in which either of a pixel in the target region and a pixel in the reference region is not a specific pixel is 1.

In step S2006, the noise reduction processor 1603 calculates degrees of similarity of the reference pixels relative to the target pixel in the target region and the reference region in accordance with the degrees of reliability determined in step S2005. As described above, Expression (15) is used for the calculation of the degrees of similarity. In step S2007, the similarity-degree correction unit 1703 obtains the degrees of reliability from the reliability-degree calculation unit 1701 and corrects the degrees of similarity calculated by the similarity-degree calculation unit 1702 in accordance with the degrees of reliability as represented by Expression (16). In step S2008, the weight calculation unit 1704 calculates weights of the reference pixels in accordance with the degrees of similarity output from the similarity-degree correction unit 1703 in step S2007. Expression (9) is used for the calculation of the weights.

In step S2009, the noise reduction processor 1603 determines whether all the reference pixels of the region parameter input in step S2002 have been processed. When the determination is affirmative, the process proceeds to step S2010 whereas when the determination is negative, the process returns to step S2004 and the process is continued. In step S2010, the weighted average calculation unit 1705 calculates correction pixel values after the noise reduction process using Expression (10) in accordance with the weights of the reference pixels relative to the target pixel calculated in step S2008.

In step S2011, the noise reduction processor 1603 determines whether all the pixels included in the image data input in step S2001 have been processed. When the determination is affirmative, the process proceeds to step S2012 whereas when the determination is negative, the process returns to step S2003 and the process is continued. In step S2012, the noise reduction processor 1603 generates correction image data using the correction pixel values generated in step S2010.

Figure 21A:
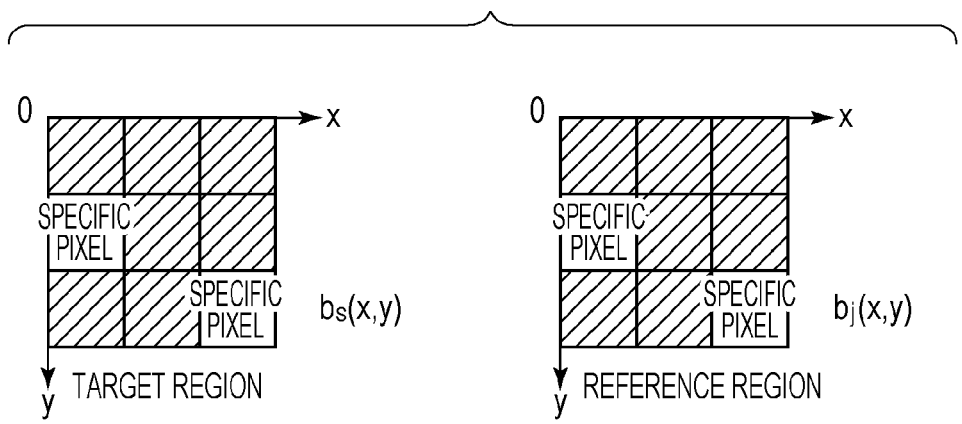
FIGS. 21A and 21B are diagrams schematically illustrating a function for calculating a weight of a reference pixel.

The noise reduction process of the image data in this embodiment is thus completed. According to this embodiment, in the target region and the reference region set for calculating degrees of similarity relative to the target pixel, the degrees of similarity are determined in accordance with degrees of reliability obtained in accordance with types of specific pixels. This is because pixels which have values which are not obtained as a result of image forming of a target of image capturing, such as specific pixels, are not used for the calculation of the degrees of similarity. FIG. 21A is a diagram illustrating the calculation of degrees of similarity in this embodiment. The target region and the reference region have pixel arrangements corresponding to each other. In a pixel position in which at least one of a pixel in the target region and a pixel in the reference region is determined as a specific pixel, a difference is not calculated. By this, a degree of similarity between a pattern represented by values of pixels in the vicinity of a target pixel and a pattern represented by values of pixels in the vicinity of a reference pixel may be calculated with higher accuracy. Consequently, an effect of the noise reduction process relative to the image data is enhanced.

Figure 21B:
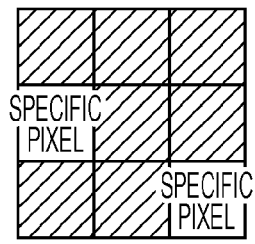

In this embodiment, the region parameter for setting the target region is not changed and the specific pixels are not included in the SSD. Here, it may be understood that the target region represented by the region parameter is changed for each reference pixel so that degrees of similarity are calculated. The method for changing the target region will be described with reference to FIGS. 21A and 21B. FIG. 21A includes diagrams illustrating a target region and a reference region in a case where the target region includes pixels in a matrix of 3 rows and 3 columns. Here, pixels which are not hatched represent specific pixels. FIG. 21B is a diagram illustrating use pixels used for calculation of a degree of similarity, and the use pixels are denoted by hatching. An obtained region parameter is changed such that a target region only includes positions of the use pixels with reference to positions of the specific pixels. As described above, for calculation of a degree of similarity, normal pixels in both of the target region and the reference region are used. The degree of similarity $C'_j$ of Expression (15) may be represented by the following expression when $E_{pq}$ is defined as represented by Expression (14).

$$C'_j = \alpha \sum_x \sum_y (b_j(x, y) - b_s(x, y))^2 \qquad (17)$$

$(x, y) \neq$ SPECIFIC PIXEL $$\alpha = \frac{\text{THE NUMBER OF PIXELS IN TARGET REGION}}{\text{THE NUMBER OF PIXELS IN TARGET REGION} - \text{THE NUMBER OF SPECIFIC PIXELS}} \qquad (18)$$

Here, a correction coefficient α is defined by the following expression: (the number of all pixels in the target region)/ ((the number of all pixels in the target region)−(the number of specific pixels)). When portions of the specific pixels are not used for calculation of the degree of similarity, the number of values to be added to one another as the SSD (or the SAD) is reduced, and accordingly, the degree of similarity $C_j$ become small. Specifically, when a specific pixel is not included in the nine pixels included in the target region and the nine pixels included in the reference region, a value obtained by adding the nine squared differences of the nine pixels in the target region and the reference region which correspond to each other to one another are determined as the degree of similarity $C_j$. On the other hand, when specific pixels are included in the target region or the reference pixels, the number of the squared differences to be added to one another is reduced by the number of pixel positions corresponding to the specific pixels. Specifically, an average of the degrees of similarity $C_j$ is proportional to the number of use pixels. Therefore, by multiplying the correction coefficient α for correction, a value of the degree of similarity obtained when it is assumed that all the pixels are used is determined in accordance with a degree of similarity obtained using the normal pixels except for the specific pixels.

Note that, when all the pixels in the target region are specific pixels, a denominator of α is 0, and accordingly, exception processing is performed. Specifically, the degree of similarity Cj is calculated using Expression (8), for example. In this case, the specific pixels are used for the calculation of the degree of similarity. However, the specific pixels do not have values obtained by forming an image of a target of image capturing, and therefore, differences in positions of the specific pixels are large. Accordingly, the degree of similarity become large, and it is highly likely that it is determined that the reference pixel is not similar to the target pixel. Alternatively, a value of the target pixel which is a specific pixel may be output as a corrected pixel value. Furthermore, as a method for calculating a degree of similarity, not only the SSD but also the SAD represented by Expression (13), for example, may be used. In this case, the degree of similarity is corrected in accordance with Expression (18).

Also in Expression (18), the correction coefficient in Expression (17) may be used. As another correction method, in a case where specific pixels are washed-out pixels or blocked-up shadows pixels and noise variance is obtained in advance, a value obtained by multiplying the number of exception pixels by double the noise variance as represented by Expression (19) may be added to a result of Expression (11). Note that, when the degree of similarity is calculated by the SAD, Expression (20) is added to a result of Expression (13).

$$2\sigma^2 N (\sigma^2\text{:NOISE VARIANCE}, N\text{:THE NUMBER OF EXCEPTION PIXELS}) \quad (19)$$

$$\sqrt{2}\sigma N (\sigma\text{:NOISE STANDARD DEVIATION}, N\text{:THE NUMBER OF EXCEPTION PIXELS}) \quad (20)$$

By this, an average reduction amount of the degrees of similarity $C_j$ may be covered. The determination method is not limited to this as long as reduction of the degree of similarity $C_j$ caused by reduction of the number of pixels used for calculation of differences is covered.

In the fourth embodiment, the method for calculating the degrees of similarity by the noise reduction processor 1603 in accordance with the degrees of reliability and calculating the weights in accordance with the appropriately-corrected degrees of similarity has been described. In a fifth embodiment, a method for determining weights in accordance with degrees of similarity calculated by Expression (11) and degrees of reliability will be described as an example. Specifically, in the fifth embodiment, pixels used for the SSD for calculating degrees of similarity are fixed and different methods for calculating weights are employed for individual reference pixels in accordance with degrees of reliability. In the fifth embodiment, descriptions of configurations the same as those of the fourth embodiment are omitted. A noise reduction processor 1603 of the fifth embodiment is different from the noise reduction processor 1603 of the fourth embodiment.

Figure 22:
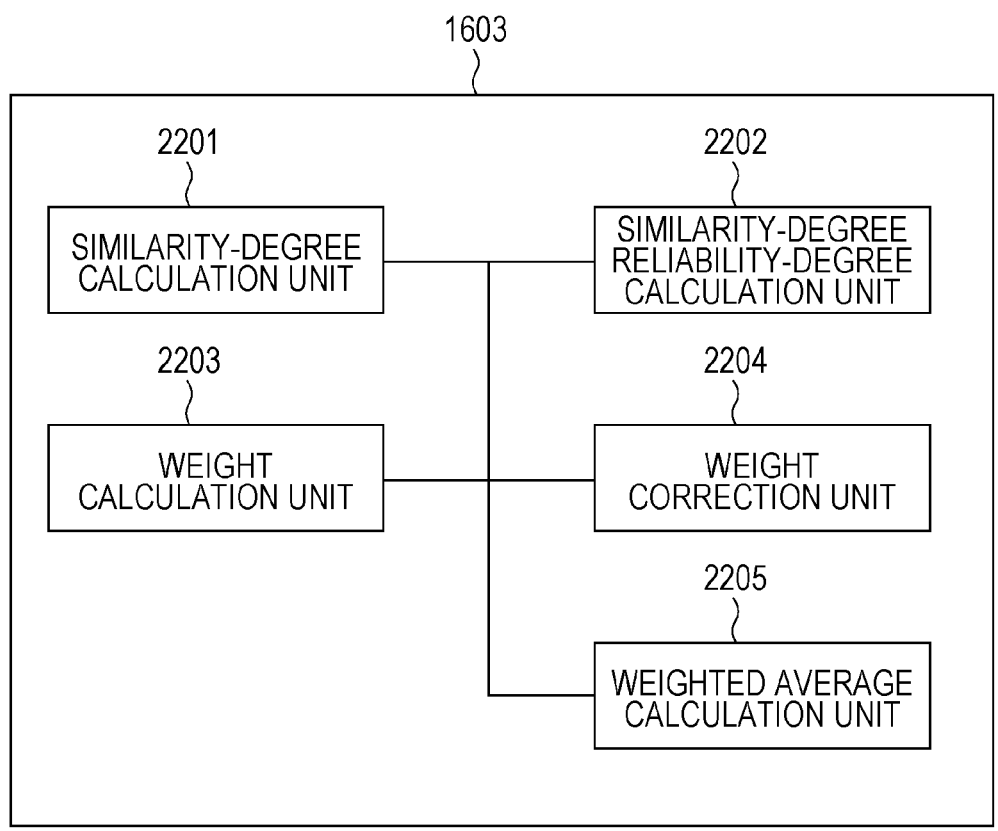
FIG. 22 is a block diagram illustrating a logical configuration of a noise reduction processor according to a fifth embodiment.

FIG. 22 is a block diagram illustrating a detailed logical configuration of the noise reduction processor 1603 applicable to the fifth embodiment. The noise reduction processor 1603 of the fifth embodiment includes a similarity-degree calculation unit 2201, a similarity-degree-reliability-degree calculation unit 2202, a weight calculation unit 2203, a weight correction unit 2204, and a weighted average calculation unit 2205.

The similarity-degree calculation unit 2201 calculates degrees of similarity of reference pixels relative to a target pixel using Expression (11). As with the fourth embodiment, in this embodiment, the degrees of similarity of the reference pixels relative to the target pixel are calculated by comparing a target region including the target pixel and a reference region including the reference pixels with each other. As represented by Expression (8), the degrees of similarity are determined by differences between pixels corresponding to each other in the target region and the reference region.

The similarity-degree-reliability-degree calculation unit 2202 calculates a parameter representing a degree of reliability of a degree of similarity calculated by the similarity-degree calculation unit 2201 as a degree of reliability of a degree of similarity β. When specific pixels are not included in the target region and the reference region, the largest degree of reliability of a degree of similarity β is obtained, and the larger the number of specific pixels is, the lower the degree of reliability of a degree of similarity β is. The degree of reliability of a degree of similarity β is calculated by Expression (21), for example.

$$\beta = \frac{\text{THE NUMBER OF PIXELS WHICH ARE NOT SPECIFIC PIXELS IN EITHER OF TARGET REGION AND REFERENCE REGION}}{\text{THE NUMBER OF PIXELS IN TARGET REGION}} \quad (21)$$

Figure 23:
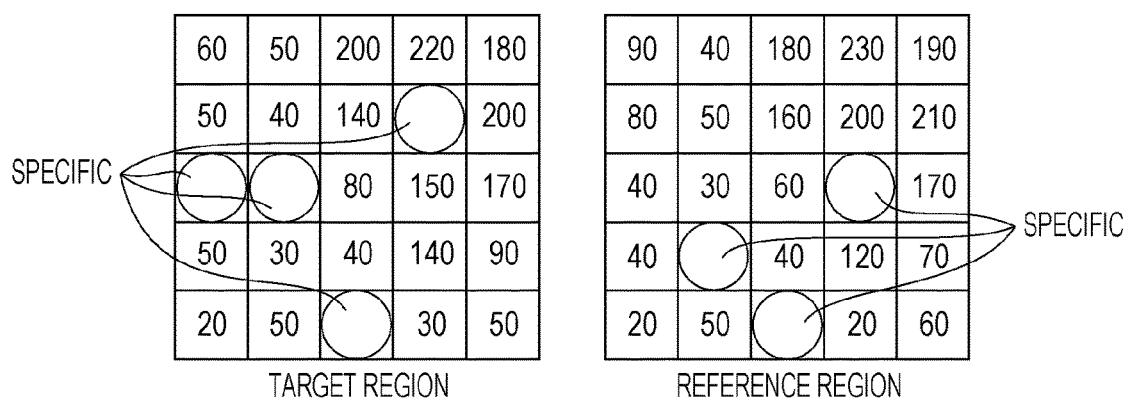
FIG. 23 is a diagram schematically illustrating a method for calculating a degree of reliability of a degree of similarity.

FIG. 23 is a diagram illustrating a degree of reliability of a degree of similarity β in a target region and a reference region including pixels in a matrix of 5 rows and 5 columns. A method for determining the degree of reliability of a degree of similarity β is not limited to this, and any determination method may be employed as long as the larger the number of pixels having values of low degrees of reliability is, the smaller a degree of reliability of a degree of similarity β is.

The weight correction unit 2204 corrects weights $w_j$ calculated by Expression (12) using Expression (22) so as to obtain weights $w_j'$.

$$w_j' = \beta w_j \quad (22)$$

When the degree of reliability of a degree of similarity β is largest (β=1 in the example of FIG. 23), that is, when a specific pixel is not included, weights calculated by Expression (12) are not corrected. Furthermore, when the degree of reliability of a degree of similarity β is small, that is, when a specific pixel is included, correction is performed so that a small weight is obtained. The weight calculation method is not limited to Expression (22), and any other methods may be employed as long as weights are corrected in accordance with the degree of reliability of a degree of similarity β. The degree of reliability of a degree of similarity β may be added as represented by the following expression, for example.

$$w_j' = w_j + \beta \quad (23)$$

As described above, since weights calculated taking specific pixels having low reliability into consideration are made small by performing correction, an adverse effect from the specific pixels to the weights may be reduced and an excellent noise reduction effect may be obtained.

Flow of Noise Reduction Process

Figure 24:
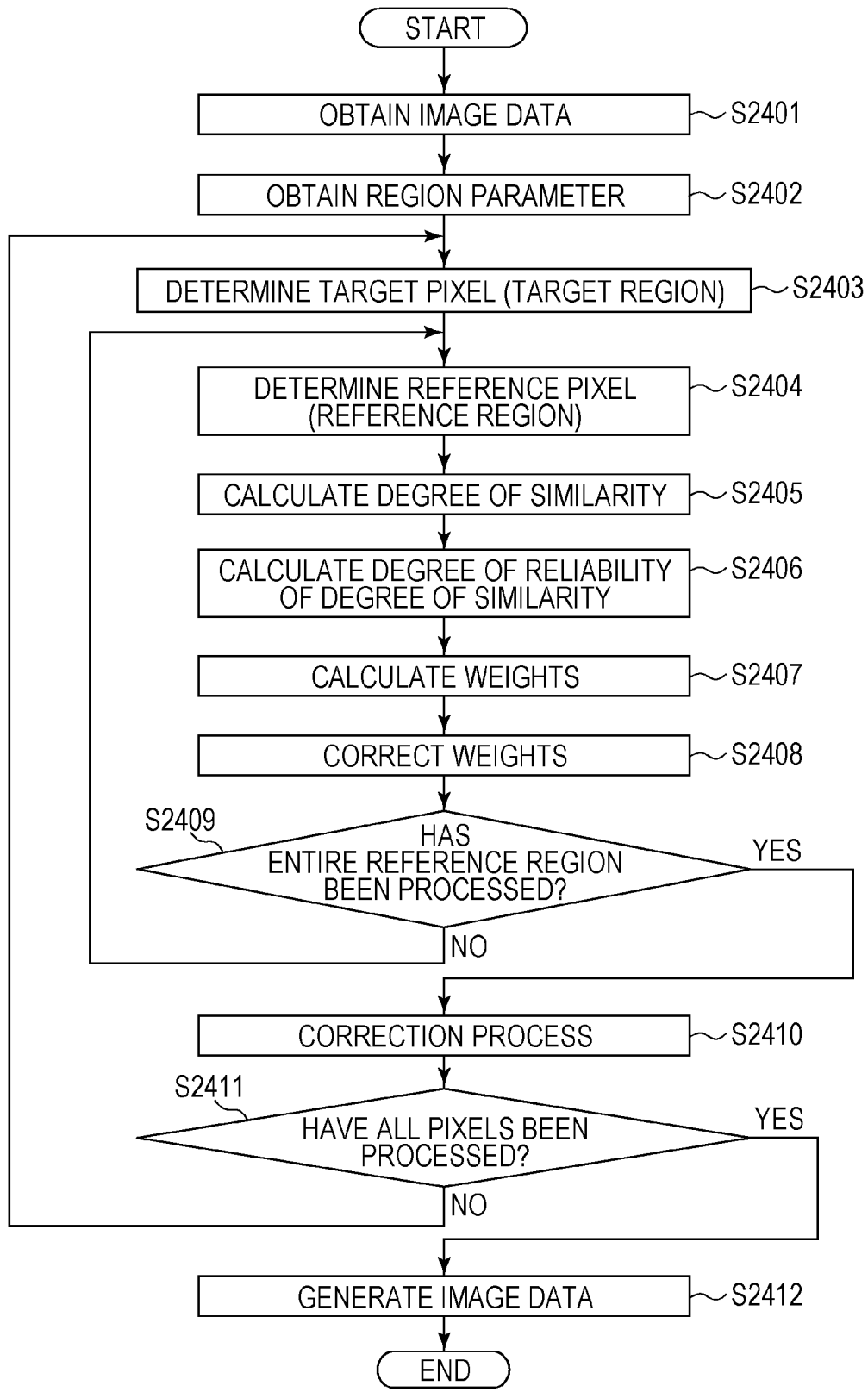
FIG. 24 is a flowchart illustrating an operation of the noise reduction processor according to the fifth embodiment.

A flow of a noise reduction process performed by the noise reduction processor 1603 of this embodiment will be described. FIG. 24 is a flowchart illustrating the noise reduction process. In step S2401, the noise reduction processor 1603 obtains image data input in step S1601. In step S2402, the noise reduction processor 1603 obtains a region parameter input in step S1602. In step S2403, the noise reduction processor 1603 determines a target pixel and a target region in accordance with the region parameter obtained in step S2402. In step S2404, the noise reduction processor 1603 determines a reference pixel and a reference region in accordance with the region parameter obtained in step S2402. In step S2405, the similarity-degree calculation unit 2201 calculates a degree of similarity between the target region and the reference region using Expression (11). In step S2406, the noise reduction processor 1603 obtains information on positions of specific pixels in the target region and the reference region and information on types of the specific pixels. Then the similarity-degree-reliability-degree calculation unit 2202 determines a degree of reliability of the degree of similarity.

In step S2407, the weight calculation unit 2203 obtains a weight in accordance with the degree of similarity calculated by the similarity-degree calculation unit 2201. The weight is calculated by Expression (12). In step S2408, the weight correction unit 2204 corrects the weight calculated by the weight calculation unit 2203 in accordance with the degree of reliability of the degree of similarity calculated by the similarity-degree-reliability-degree calculation unit 2202. In step S2409, the noise reduction processor 1603 determines whether all the reference pixels corresponding to the parameter input in step S2402 have been processed. When the determination is affirmative, the process proceeds to step S2410 whereas when the determination is negative, the process returns to step S2404 and the process is continued.

In step S2410, the weighted average calculation unit 2205 calculates correction pixel values after the noise reduction process using Expression (10) in accordance with values of the reference pixels and weights of the reference pixels relative to the target pixel. In step S2411, the noise reduction processor 1603 determines whether all the pixels included in the image data input in step S2401 have been processed. When the determination is affirmative, the process proceeds to step S2412 whereas when the determination is negative, the process returns to step S2403 and the process is continued. In step S2412, the noise reduction processor 1603 generates correction image data constituted by the correction pixel values generated by correcting the pixels in step S2410.

In the fourth and fifth embodiments, the degrees of similarity $C_j$ and the weights $w_j$ are determined in accordance with specific pixels. Since values in a range from 0 to 1 are set as the degrees of reliability and the degrees of reliability of degrees of similarity, the degrees of similarity and the weights may be adjusted in accordance with types of the specific pixels. However, as with the first embodiment, a configuration in which a determination as to whether specific pixels are to be used is made may be employed.

Other Embodiments

In the foregoing embodiments, the processes performed in accordance with an image processing application are described as examples. However, the processes may be performed in image processing hardware in an image pickup apparatus on image data captured by the image pickup apparatus. Furthermore, image data may be transmitted from a client apparatus to an image processing application included in a server apparatus, and the image data may be processed in the server apparatus.

Furthermore, the 3D position estimation process and the noise reduction process have been described as examples to which the present disclosure is applied in the foregoing embodiments. However, the present disclosure is not limited to the foregoing embodiments as long as an image process employing a method for calculating a degree of similarity between regions is performed.

Furthermore, the present disclosure may be realized by executing the following process. Specifically, software (programs) which realizes the functions of the foregoing embodiments is supplied to a system or an apparatus through a network or various storage media, and a computer (or a CPU, a micro processing unit (MPU), or the like) of a computer of the system of the apparatus reads and executes the programs.

According to the present invention, even when a defective pixel, a special-purpose pixel, a washed-out pixel, a blocked-up shadows pixel, or the like is included in a region of image data, a degree of similarity between regions may be calculated with high accuracy.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiments of the present disclosure, and by a method performed by the computer of the system or apparatus by, for example, reading out and executing the computer executable instructions from the storage medium to perform the functions of one or more of the above-described embodiments. The computer may comprise one or more of a CPU, MPU, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-248039, filed Nov. 29, 2013, which is hereby incorporated by reference herein in its entirety.

What is claimed is:

1. An image processing apparatus which executes image processing on image data obtained by forming an image on an image pickup element, the image processing apparatus comprising a memory and a processor that execute a program to function as:
   an obtaining unit configured to obtain a pixel in the image data corresponding to a fixed position in the image pickup element as a specific pixel;
   a determination unit configured to determine a target region including a target pixel and a reference region including a reference pixel which are used for determining a degree of similarity between the target pixel and the reference pixel in accordance with the specific pixel obtained by the obtaining unit; and
   a calculation unit configured to calculate a degree of similarity between the target pixel and the reference pixel by comparing the target region and the reference region determined by the determination unit,
   wherein the determination unit sets the target region and the reference region such that the degree of similarity is calculated using pixels other than specific pixels included in the image data.

2. The image processing apparatus according to claim 1, wherein the calculation unit calculates a plurality of degrees of similarity using a plurality of pixels as reference pixels.

3. The image processing apparatus according to claim 1, wherein the determination unit stores a predetermined region and determines the target region and the reference region such that pixel positions of specific pixels are not included in the target region and the reference region when the predetermined region is applied to the target pixel and the reference pixel.

4. The image processing apparatus according to claim 1, wherein first image data including the target pixel and second image data including the reference pixels are obtained by performing image capturing from different viewpoints, and the image processing apparatus further includes a search unit configured to search the second image data for a point corresponding to the target pixel in accordance with the degrees of similarity.

5. The image processing apparatus according to claim 1, wherein the target pixel and the reference pixels are included in the same image data, and the image processing apparatus further includes a noise reduction processor configured to determine a value of the target pixel by calculating a weighted average using the reference pixels in accordance with weights corresponding to the degrees of similarity.

6. The image processing apparatus according to claim 1, wherein the memory and the processor execute the program to further function as:

a correction unit configured to correct the degrees of similarity in accordance with a number of pixels used for calculation of the degrees of similarity.

7. The image processing apparatus according to claim 1, wherein it is highly likely that specific positions in the image pickup element do not have pixel values obtained by forming an image of a target of image capturing.

8. The image processing apparatus according to claim 7, wherein the specific pixels included in the image data correspond to washed-out pixels or blocked-up shadows pixels.

9. The image processing apparatus according to claim 7, wherein the specific pixels included in the image data correspond to defective pixels.

10. The image processing apparatus according to claim 1, wherein the determination unit determines pixels other than the specific pixels in pixels arranged in a matrix of N rows and M columns including the target pixel as the target region, and determines pixels other than the specific pixels in pixels arranged in a matrix of N rows and M columns including the reference pixel as the reference region.

11. The image processing apparatus according to claim 1, wherein the calculation unit calculates a degree of similarity in accordance with a sum of differences between pixels included in the target region and pixels included in the reference region corresponding to the pixels in the target region and excepts a difference between a pixel included in the target region and a pixel included in the reference region corresponding to the pixel included in the target region from the sum when at least one of the pixel included in the target region and the pixel included in the reference region is a specific pixel.

12. An image processing apparatus which executes image processing on image data obtained by forming an image on an image pickup element, the image processing apparatus comprising a memory and a processor that execute a program to function as:

an obtaining unit configured to obtain a pixel in the image data corresponding to a specific position in the image pickup element as a specific pixel; and a determination unit configured to determine degrees of similarity between a target pixel and reference pixels in the image data by calculating differences between pixels corresponding to positions of the pixels in the target region including the target pixel and the reference region including the reference pixels, wherein the determination unit determines the degrees of similarity without using differences of values of specific pixels in the image data, and wherein the determination unit sets the target region and the reference region such that the degree of similarity is calculated using pixels other than specific pixels included in the image data.

13. A non-transitory storage medium which stores a computer program which causes a computer to function as an image processing apparatus which executes image processing on image data obtained by forming an image on an image pickup element, when the computer program is read and executed by the computer, the image processing apparatus comprising a memory and a processor that execute a program to function as:

an obtaining unit configured to obtain a pixel in the image data corresponding to a specific position in the image pickup element as a specific pixel;

a determination unit configured to determine a target region including a target pixel and a reference region including a reference pixel which are used for determining a degree of similarity between the target pixel and the reference pixel in accordance with the specific pixel obtained by the obtaining unit; and a calculation unit configured to calculate a degree of similarity between the target pixel and the reference pixel by comparing the target region and the reference region determined by the determination unit, wherein the determination unit sets the target region and the reference region such that the degree of similarity is calculated using pixels other than specific pixels included in the image data.

14. An image processing method for executing image processing on image data obtained by forming an image on an image pickup element, the image processing method comprising:

obtaining a pixel in the image data corresponding to a specific position in the image pickup element as a specific pixel;

determining a target region including a target pixel and a reference region including a reference pixel which are used for determining a degree of similarity between the target pixel and the reference pixel in accordance with the obtained specific pixel; and calculating a degree of similarity between the target pixel and the reference pixel by comparing the target region and the reference region with each other, wherein the determining sets the target region and the reference region such that the degree of similarity is calculated using pixels other than specific pixels included in the image data.

* * * * *